(12) United States Patent
Harada et al.

(10) Patent No.: US 8,012,579 B2
(45) Date of Patent: Sep. 6, 2011

(54) LAMINATED BODY CONTAINING PARTICLE DISPERSION LAYER, METHOD FOR PRODUCING THE SAME, AND LIGHT MODULATION DEVICE

(75) Inventors: Haruo Harada, Kanagawa (JP); Makoto Gomyo, Kanagawa (JP); Yasunori Okano, Kanagawa (JP); Taijyu Gan, Kanagawa (JP); Chisato Urano, Kanagawa (JP); Hiroshi Arisawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1126 days.

(21) Appl. No.: 11/808,088

(22) Filed: Jun. 6, 2007

(65) Prior Publication Data

US 2008/0123179 A1     May 29, 2008

(30) Foreign Application Priority Data

Nov. 29, 2006    (JP) ................................ 2006-321058

(51) Int. Cl.
*B32B 5/16* (2006.01)
*B32B 9/04* (2006.01)
*B05D 3/02* (2006.01)
*H04B 10/04* (2006.01)

(52) U.S. Cl. .................. 428/323; 428/411.1; 427/372.2; 398/172

(58) Field of Classification Search .......................... None
See application file for complete search history.

(56) References Cited

U.S. PATENT DOCUMENTS

| 4,435,047 A | 3/1984 | Fergason |
| 6,067,135 A | 5/2000 | Shimizu et al. |
| 2005/0200775 A1 | 9/2005 | Harada et al. |

FOREIGN PATENT DOCUMENTS

| JP | B2 7-9512 | 2/1995 |
| JP | A9-236791 | 9/1997 |
| JP | A 11-237644 | 8/1999 |
| JP | B2 3178530 | 4/2001 |
| JP | A 2001-154219 | 6/2001 |
| JP | A 2005-258310 | 9/2005 |
| JP | A 2006-64805 | 3/2006 |

*Primary Examiner* — Sheeba Ahmed
(74) *Attorney, Agent, or Firm* — Oliff & Berridge, PLC

(57) ABSTRACT

A laminated body comprises: a particle dispersion layer comprising a first material and particles dispersed in the first material, the first material being changed from a gel state to a sol state upon increase in temperature; and a coated layer comprising a second material, the second material is changed from a gel state to a sol state upon increase in temperature, is changed from a gel state to a sol state upon decrease in temperature, and shows a hysteresis behavior in sol-gel change upon change in temperature, wherein the particle dispersion layer in a sol state and the coated layer in a gel state are laminated in contact with each other, and in a state where each of the particle dispersion layer and the coated layer contains a solvent, a maximum temperature $T_1$ where the first material maintains a gel state is less than a maximum temperature $T_2$ where the second material maintains a gel state upon increase in temperature ($T_1 < T_2$).

23 Claims, 16 Drawing Sheets

FIG. 3

| | (1) DURING APPLYING STEP OF PARTICLE DISPERSION LIQUID | (2) AFTER COMPLETING COOLING STEP OF PARTICLE DISPERSION | (3) DURING APPLYING STEP OF COATED LAYER APPLYING LIQUID | (5) BEFORE TEMPERATURE INCREASING STEP | (5) AFTER COMPLETING TEMPERATURE INCREASING STEP | (6) AFTER COMPLETING DRYING STEP FOR HARDENING (FINISHED) |
|---|---|---|---|---|---|---|
| APPEARANCE (SCHEMATIC CROSS SECTIONAL VIEW) | PARTICLE DISPERSION LIQUID / SOFT / SUBSTRATE | HARD | COATED LAYER APPLYING LIQUID / SOFT / HARD | HARD / HARD | HARD / SOFT | PARTICLE COATED DISPERSION LAYER / LAYER |
| TEMPERATURE | HIGH | LOW | HIGH/LOW | LOW | HIGH | |
| STATE OF COATED LAYER (APPLYING LIQUID) | — | — | SOL | GEL | GEL | DRIED SOLID |
| STATE OF PARTICLE DISPERSION LAYER (LIQUID) | SOL | GEL | GEL | GEL | SOL | DRIED SOLID |

FIG. 5

| | (1) DURING APPLYING STEP OF PARTICLE DISPERSION LIQUID | (2) AFTER COMPLETING PRELIMINARY HARDENING STEP | (3) DURING APPLYING STEP OF COATED LAYER APPLYING LIQUID | (5) BEFORE TEMPERATURE INCREASING STEP | (5) AFTER COMPLETING TEMPERATURE INCREASING STEP | (6) AFTER COMPLETING DRYING STEP FOR HARDENING (FINISHED) |
|---|---|---|---|---|---|---|
| APPEARANCE (SCHEMATIC CROSS SECTIONAL VIEW) | PARTICLE DISPERSION LIQUID / SOFT / SUBSTRATE | HARD | COATED LAYER APPLYING LIQUID / SOFT / HARD | HARD / HARD | HARD / SOFT | PARTICLE DISPERSION LAYER / COATED LAYER |
| TEMPERATURE | HIGH | HIGH | HIGH/HIGH-LOW | LOW | HIGH | |
| STATE OF COATED LAYER (APPLYING LIQUID) | - | - | SOL | GEL | GEL | DRIED SOLID |
| STATE OF PARTICLE DISPERSION LAYER (LIQUID) | SOL | DRIED SOLID | GEL / DRIED SOLID | GEL / DRIED SOLID | SOL | DRIED SOLID |

FIG. 6

| | (1) DURING APPLYING STEP OF PARTICLE DISPERSION LIQUID | (3) DURING APPLYING STEP OF COATED LAYER APPLYING LIQUID | (5) BEFORE TEMPERATURE INCREASING STEP | (5) AFTER COMPLETING TEMPERATURE INCREASING STEP | (6) AFTER COMPLETING DRYING STEP FOR HARDENING (FINISHED) |
|---|---|---|---|---|---|
| APPEARANCE (SCHEMATIC CROSS SECTIONAL VIEW) | PARTICLE DISPERSION LIQUID / SOFT / SUBSTRATE | COATED LAYER APPLYING LIQUID / SOFT / SOFT | HARD / HARD | HARD / SOFT | COATED LAYER / PARTICLE DISPERSION LAYER |
| TEMPERATURE | HIGH | HIGH | LOW | HIGH | |
| STATE OF COATED LAYER (APPLYING LIQUID) | — | SOL | GEL | GEL | DRIED SOLID |
| STATE OF PARTICLE DISPERSION LAYER (LIQUID) | SOL | SOL | GEL | SOL | DRIED SOLID |

LIQUID CRYSTAL LEAKED ONTO PROTECTIVE LAYER

PLANAR

FOCAL CONIC

HOMEOTROPIC

LAMINATED BODY CONTAINING PARTICLE DISPERSION LAYER, METHOD FOR PRODUCING THE SAME, AND LIGHT MODULATION DEVICE

CROSS-REFERENCE TO RELATED APPLICATIONS

This application is based on and claims priority under 35 USC 119 from Japanese Patent Application No. 2006-321058 filed Nov. 29, 2007.

BACKGROUND (i) Technical Field

The present invention relates to a laminated body containing a particle dispersion layer, a method for producing the same, and a light modulation device.

(ii) Related Art

Various rewritable marking techniques excellent in convenience have been studied, and a light modulation device using a cholesteric liquid crystal as one type thereof receives attention in recent years since it has such characteristics as memory effect for retaining display without power source, bright display owing to absence of polarizing plate, and color display without color filter.

A planar phase shown by a cholesteric liquid crystal (chiral nematic liquid crystal) produces selective reflection phenomenon, in which light incident in parallel to the helical axis is separated into right-handed polarized light and left-handed polarized light, a circularly polarized light component agreeing with the torsional axis of helix is subjected to Bragg reflection, and the remaining light is transmitted. The center wavelength $\lambda$ and the reflection wavelength width $\Delta\lambda$ are expressed by $\lambda = n \cdot p$ and $\Delta\lambda = \Delta n \cdot p$, respectively, wherein p represents the helical pitch, n represents the average refractive index in the plane perpendicular to the helical axis, and $\Delta n$ represents the birefringence, and reflected light from a cholesteric liquid crystal layer in a planar phase shows bright color depending on the helical pitch.

A cholesteric liquid crystal having a positive dielectric anisotropy shows three states, i.e., a planar phase shown in FIG. 15A, in which a helical axis is perpendicular to the cell surface, whereby the incident light is subjected to the aforementioned selective reflection phenomenon, a focal conic phase shown in FIG. 15B, in which the helical axis is substantially in parallel to the cell surface, whereby the incident light is transmitted with slight amount of forward scattered light, and a homeotropic phase shown in FIG. 15C, in which the helical structure is raveled out to make the liquid crystal director directed to the direction of the electric field, whereby the incident light is transmitted substantially completely.

Among the three phases, the planar phase and the focal conic phase can be present bistably under no electric field. Accordingly, the phase state of a cholesteric liquid crystal cannot be determined unconditionally with respect to the intensity of the electric field applied to the liquid crystal layer, and in the case where the initial state is a planar phase, it is changed from a planar phase to a focal conic phase and a homeotropic phase in this order upon increase in electric field intensity, and in the case where the initial state is a focal conic phase, it is changed from a focal conic phase to a homeotropic phase upon increase in electric field intensity.

In the case where the intensity of the electric field applied to the liquid crystal layer is quickly removed, a planar phase and a focal conic phase maintain their states, respectively, and a homeotropic phase is changed to a planar phase.

Accordingly, a cholesteric liquid crystal layer immediately after applying with a pulse signal shows a switching behavior shown in FIG. 16, in which a selective reflection state, in which a homeotropic phase is changed to a planar phase, is produced in the case where the voltage of the pulse signal applied is Vfh or more, a transmission state with a focal conic phase is produced in the case where the voltage is between Vpf and Vfh, and the state before application of the pulse signal, i.e., a selective reflection state with a planar phase or a transmission state with a focal conic phase, is maintained in the case where the voltage is Vpf or less.

In FIG. 16, the ordinate shows the normalized light reflectivity, which is normalized with the maximum reflectivity as 100 and the minimum reflectivity as 0. Because transition areas are present among the planar phase, the focal conic phase and the homeotropic phase, the case where the normalized reflectivity is 50 or more is designated as the selective reflection state, and the case where the normalized reflectivity is less than 50 is designated as the transmission state, with Vpf as the threshold voltage of phase change between the planar phase and the focal conic phase and Vfh as the threshold voltage of phase change between the focal conic phase and the homeotropic phase.

The cholesteric liquid crystal device may have a structure, in which a liquid crystal is sealed as a continuous phase between a pair of display substrates, and may also have a PDLC (polymer dispersed liquid crystal) structure, in which a cholesteric liquid crystal is dispersed as droplets in a polymer binder, and a PDMLC (polymer dispersed microencapsulated liquid crystal) structure, in which a microencapsulated cholesteric liquid crystal is dispersed in a polymer binder.

The use of the PDLC structure and the PDMLC structure reduces flowability of the liquid crystal to suppress disorder in images due to bending and pressure, whereby a flexible medium is realized. Furthermore, color display is realized by directly laminating plural cholesteric liquid crystal layers, and a display device addressing images with light signal can be produced by laminating a photoconductor layer to the liquid crystal layer. Moreover, the display layer can be formed by using a thick film printing technique, whereby the production method can be simplified to save the production cost.

SUMMARY

According to an aspect of the invention, there is provided a laminated body comprising: a particle dispersion layer comprising a first material and particles dispersed in the first material, the first material being changed from a gel state to a sol state upon increase in temperature; and a coated layer comprising a second material, the second material being changed from a gel state to a sol state upon increase in temperature, being changed from a sol state to a gel state upon decrease in temperature, and showing a hysteresis behavior in sol-gel change upon change in temperature, wherein the particle dispersion layer in a sol state and the coated layer in a gel state are laminated in contact with each other, and in a state where each of the particle dispersion layer and the coated layer contains a solvent, a maximum temperature $T_1$ where the first material maintains a gel state is less than a maximum temperature $T_2$ where the second material maintains a gel state upon increase in temperature ($T_1 < T_2$).

BRIEF DESCRIPTION OF THE DRAWINGS

Exemplary embodiments of the present invention will be described in detail based on the following figure, wherein:

FIG. 3 is a table showing the production steps of the production method of a laminated body according to the invention containing a cooling step of a particle dispersion liquid with the laminated body shown in FIG. 1 as an example, in which the states of the appearance (cross section) and the layers are schematically shown for the steps, respectively;

FIG. 5 is a table showing the production steps of the production method of a laminated body according to the invention containing a preliminary hardening step with the laminated body shown in FIG. 1 as an example, in which the states of the appearance (cross section) and the layers are schematically shown for the steps, respectively;

FIG. 6 is a table showing the production steps of the production method of a laminated body according to the invention that does not contain the cooling step of a particle dispersion liquid and the preliminary hardening step with the laminated body shown in FIG. 1 as an example, in which the states of the appearance (cross section) and the layers are schematically shown for the steps, respectively;

FIG. 11D is a drawing of the laminated body finally produced;

FIGS. 15A to 15C are schematic diagrams showing the relationship between a molecular arrangement of a cholesteric liquid crystal and optical characteristics, in which FIG. 15A shows a planar phase, FIG. 15B shows a focal conic phase, and FIG. 15C shows a homeotropic phase.

DETAILED DESCRIPTION

The laminated body, the method for producing the same, and the light modulation device of the invention will be described, respectively, in detail below.

(Laminated Body)

The laminated body of the invention contains a particle dispersion layer containing a first material that is changed from a gel state to a sol state upon increase in temperature and particles dispersed in the first material, and a coated layer containing a second material that is changed from a gel state to a sol state upon increase in temperature, is changed from a sol state to a gel state upon decrease in temperature, and shows a hysteresis behavior in sol-gel change upon change in temperature, the particle dispersion layer in a sol state and the coated layer in a gel state are laminated in contact with each other, and in a state where the layers contain a solvent, a maximum temperature $T_1$ where the first material maintains a gel state is less than a maximum temperature $T_2$ where the second material maintains a gel state upon increase in temperature ($T_1<T_2$).

Figure 1:
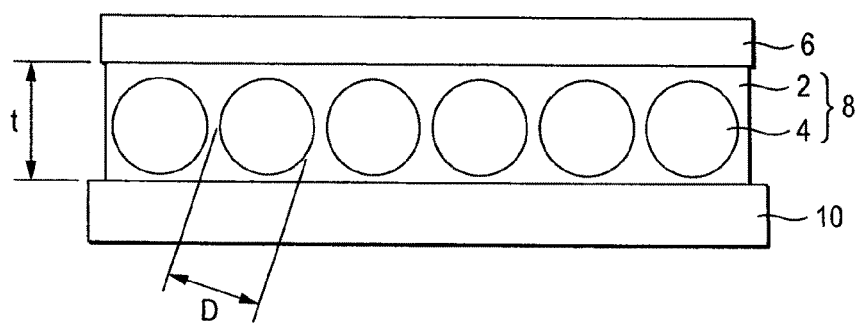
FIG. 1 is a cross sectional view showing a laminated body as one exemplary embodiment of the invention.

FIG. 1 is a cross sectional view showing a laminated body as one exemplary embodiment of the invention. The laminated body of the exemplary embodiment has a substrate 10, having laminated on the surface thereof, a particle dispersion layer 8 containing particles 2 dispersed in a matrix 4, and a coated layer 6.

The laminated body of the invention may have other layers than the three layers including the substrate 10. The substrate 10 may not be used, or the particle dispersion layer 8 and the coated layer 6 may be laminated on a certain layer having been formed on the substrate 10 but not directly on the substrate 10. In other words, laminated bodies having two or more layers, in which layers corresponding to the particle dispersion layer 8 and the coated layer 6 are arranged adjacent to each other, are encompassed in the scope of the invention provided that the other requirements of the invention are satisfied.

The particles 2 dispersed in the layer may be various kinds of particles depending on the purpose of the laminated body. For example, in the case where the laminated body is a light modulation device described layer, the particles 2 may be particles containing a light modulation substance or a microencapsulated light modulation substance. Substances having coloring property, electroconductivity, luminous property, adhesion property, chemical reactivity and the like may be used as the particles 2 depending on purposes.

The matrix 4 is formed by hardening the first material. The first material is a colloid solution that is changed from a gel state to a sol state upon increase in temperature, and various substances are exemplified as colloid particles and a solvent therefor. The colloid particles constituting the first material may be a natural polymer, a synthetic polymer and a semi-synthetic polymer. Examples thereof include a polymer, such as gelatin, cellulose, carrageenan, alginic acid, xanthone gum, pectin, seed gum, furcelleran, curdlan, polyvinyl alcohol, polyacrylonitrile and polyethylene oxide, a derivative of the polymer, and a mixture of a polymer having no low-temperature gelation property and the aforementioned polymer as a low-temperature gelation agent. The colloid solution preferably has a large jelly strength and a low sol viscosity.

In the case where gelatin is used as the colloid particles constituting the first material, such a material is preferred that a small amount of β-chains and γ-chains having a large molecular weight, which are polymers of α-chains, a small amount of low molecular weight component formed by breaking the main chains of α-chains are small, and a large remaining amount of α-chains. A gelatin material obtained by processing bovine bone satisfies these conditions and is preferred owing the large jelly strength and the low sol viscosity thereof. A primary extract obtained firstly by electrolysis of collagen as a raw material is preferably used. Ionic components remaining in gelatin may be removed depending on necessity by a known measure, such as an ion exchange resin.

The solvent used in the colloid solution constituting the first material dissolves and disperses the aforementioned colloid particles, such as gelatin, but does not dissolves the particles to be dispersed. For example, in the case where liquid crystal microcapsules described later are used as the particles to be dispersed, a solvent that does not dissolve at least the polymer shell of the microcapsules is used. Examples of the solvent used in the invention include water and a mixture of water and an alcohol, such as methanol, ethanol and glycol.

The coated layer 6 contains the second material. The second material is a colloid solution that is changed from a gel state to a sol state upon increase in temperature, is changed from a gel state to a sol state upon decrease in temperature, and shows a hysteresis behavior in sol-gel change upon change in temperature, and examples of colloid particles and a solvent therefor include various compounds.

Figure 2:
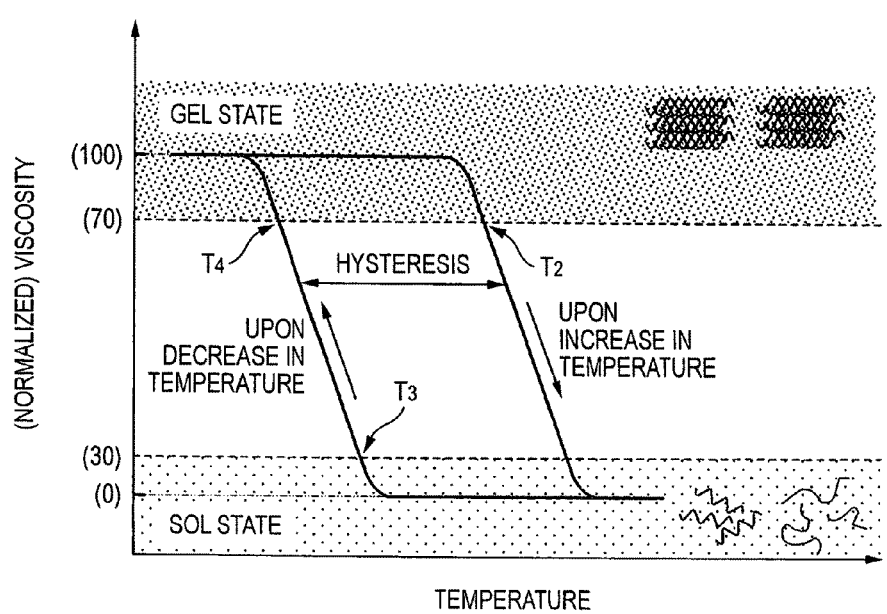
FIG. 2 is a graph showing change in state of the second material exhibiting a typical hysteresis behavior with respect to temperature, in which the abscissa indicates the temperature, and the ordinate indicates the viscosity.

FIG. 2 is a graph showing change in state of the second material used in the invention with respect to temperature. The graph shows relationship between the temperature as the abscissa and the viscosity as the ordinate of a material exhibiting a typical hysteresis behavior for describing the hysteresis behavior of the second material. The second material that can be used in the invention may have such characteristics that are slightly deviated from the ideal change in viscosity shown in the graph.

As shown in FIG. 2, the temperatures at which sol-gel change occurs are different from each other between increase and decrease in temperature, and the behavior is referred to as hysteresis. The curve of the graph shown in FIG. 2 is referred to as a hysteresis curve. A substance exhibiting sol-gel change shows a hysteresis behavior in some extent, and in the production method of the laminated body of the invention described later, various materials may be used as the second material by properly controlling the temperature with respect to the hysteresis behavior of the materials. In other words, in the case where a material has such a hysteresis behavior that can be used as the second material in the production method of the laminated body of the invention, it can be understood that the material has such a hysteresis behavior as the second material of the laminated body of the invention.

However, in the case where the hysteresis behavior is too small (i.e., the temperatures at which sol-gel change occurs upon increase and decrease in temperature are not distant so much), the conditions (particularly, temperature) for attaining the advantages of the invention are narrowed, and therefore, the second material preferably exhibits a pronounced hysteresis behavior. Accordingly, the hysteresis behavior of the second material used in the laminated body of the invention preferably satisfies the following conditions.

As the second material, in the case where a material to be measured is increased and decreased in temperature at a rate of 2° C. per minute, such a hysteresis behavior is preferred that the maximum temperature $T_2$ where a gel state is maintained upon increase in temperature is higher than the minimum temperature $T_3$ where a sol state is maintained upon decrease in temperature ($T_2 > T_3$), and such a hysteresis behavior is more preferred that the maximum temperature $T_2$ is higher than the minimum temperature $T_3$ by 10° C. or more ($T_2 \geq T_3 + 10°$ C.). (See FIG. 2.)

The term "temperature" in the maximum temperature $T_2$ where the second material maintains a gel state means a critical temperature, at which the normalized viscosity of the material (colloid solution) becomes 70 or more where the viscosity is normalized with the saturated viscosity in a gel state as 100 and the saturated viscosity in a sol state as 0.

Similarly, the terms "gelled" and "in a gel state" are also applied with the aforementioned viscosity standard, and the terms "gelled" and "in a gel state" are used when the normalized viscosity becomes 70 or more. This standard is also applied to the first material.

The term "temperature" in the minimum temperature $T_3$ where the second material maintains a sol state means a critical temperature, at which the normalized viscosity of the material becomes 30 or less. Similarly, the terms "solled" and "in a sol state" means that the normalized viscosity of the material becomes 30 or less. The standards are also applied to the first material.

The colloid particles constituting the second material may be a natural polymer, a synthetic polymer and a semi-synthetic polymer. Examples thereof include a polymer, such as agar, gelatin, cellulose, carrageenan, alginic acid, xanthone gum, pectin, seed gum, furcelleran, curdlan, polyvinyl alcohol, polyacrylonitrile and polyethylene oxide, a derivative of the polymer, and a mixture of the polymers, and a mixture of a polymer having no low-temperature gelation property and the aforementioned polymer as a low-temperature gelation agent. Among these, agar and a derivative thereof are preferred owing to a large hysteresis behavior thereof. The polymer solution preferably has a large jelly strength and a low sol viscosity.

The solvent used in the colloid solution constituting the second material dissolves the aforementioned material, such as agar and a derivative thereof. Examples of the solvent used in the invention include water and a mixture of water and an alcohol, such as methanol, ethanol and glycol.

The first material and the second material may further contain, addition to the aforementioned essential components, various additives, such as a surfactant, a dispersant, a thickener, a wettability improving agent, a defoaming agent and a drying rate controlling agent, depending on the purpose of the laminated body.

The particle dispersion layer 8 and the coated layer 6 are formed by hardening the first material and the second material constituting the layers, respectively. The hardening operation is generally carried out by drying for hardening under heating. The solvents in the first material and the second material are evaporated by drying for hardening, and the colloid particles contained therein are aggregated to form the layers.

Upon drying for hardening the laminated body of the invention, the second material is changed to a gel state while the first material is in a sol state or a state equivalent thereto, whereby the coated layer in a gel state effectively presses the particles in the particle dispersion liquid in a sol state or a state equivalent thereto. In order to ensure the temperature conditions attaining the states, the maximum temperature $T_1$ where the first material maintains a gel state is preferably less than the maximum temperature $T_2$ where the second material maintains a gel state upon increase in temperature ($T_1 < T_2$), the maximum temperature $T_1$ is more preferably less than the maximum temperature $T_2$ by 10° C. or more ($T_1+10\leq T_2$), and the maximum temperature $T_1$ is further preferably less than the maximum temperature $T_2$ by 20° C. or more ($T_1+20\leq T_2$). (See FIG. 4.)

The particles 2 are preferably dispersed in the form of a single layer in the particle dispersion layer 8 as shown in FIG. 1 depending on the purpose of the laminated body, and the particles 2 may be dispersed in the form of an accumulated layer having two or three layers or more.

In the laminated body of the invention, the particle diameter of the particles 2 and the thickness of the particle dispersion layer 8 and the coated layer 6 are not particularly limited and may be arbitrarily selected depending on the purpose of the laminated body. Specifically, the particle diameter of the particles 2 may be appropriately selected from a range of about from 100 nm to 1 mm, the thickness of the particle dispersion layer 8 may be appropriately selected from a range of about from 50 nm to 2 mm, and the thickness of the coated layer 6 may be appropriately selected from a range of about from 100 nm to 1 mm.

In order to disperse the particles 2 in the particle dispersion layer 8 in the form of a closely packed single layer, the particle diameter D of the particles and the thickness t of the particle dispersion layer preferably satisfy the following expression (A)

$$0.5t \leq D \leq 2t \quad (A)$$

In the expression (A), the left side is more preferably 0.7 t, and further preferably 0.8 t, and the right side is more preferably 1.3 t, and further preferably 1.2 t.

The particle diameter D referred herein means the number average particle diameter (sphere-equivalent diameter in the case where the particles are not sphere), and for example, is a value obtained in such a manner that 2,000 particles arbitrarily sampled from the particles to be measured are observed with a microscope to obtain an image, the diameters of the particles are obtained by digitally processing the image, and the number average value of the diameters is then obtained. In alternative, the diameter D may be obtained by the light interception method, in which the particle diameter is obtained from the change in transmission light through passage of the particles, and a method using a light scattering particle diameter measuring equipment, in which the particle diameter distribution is determined by measuring the light scattering intensity, which is changed with respect to the particle diameter.

According to the production method of a laminated body of the invention described later, a laminated body shown in FIG. 1 can be produced, in which the particles 2 are dispersed in the form of a closely packed single layer in the particle dispersion layer 8.

(Production Method of Laminated Body)

The production method of a laminated body of the invention (which is referred simply to as the production method of the invention in some cases) contains (1) an applying step of a particle dispersion liquid, (2) a cooling step of a particle dispersion liquid, (3) a applying step of a coated layer applying liquid, (4) a cooling step of a coated layer applying liquid, (5) a temperature increasing step, and (6) a drying step for hardening. The cooling step of a particle dispersion liquid (2) and the cooling step of a coated layer applying liquid (4) are not essential steps as described later. Instead of or in addition to the cooling step of a particle dispersion liquid (2), (2') a preliminary hardening step may be contained.

The production method will be described below for the case that contains the cooling step of a particle dispersion liquid, the case that contains the preliminary hardening step, and the case that does not contain both the cooling step of a particle dispersion liquid and the preliminary hardening step, respectively.

The following description of the production method also referrers to the case where a light modulation layer and a protective layer of a light modulation device of the invention described later are formed.

(Case that Contains Cooling Step of Particle Dispersion Liquid)

FIG. 3 is a table showing the production steps of the production method of a laminated body according to the invention containing a cooling step of a particle dispersion liquid with the laminated body shown in FIG. 1 as an example, in which the states of the appearance (cross section) and the layers are schematically shown for the steps, respectively. The production steps will be described below.

(1) Applying Step of Particle Dispersion Liquid

In the applying step of a particle dispersion liquid, a particle dispersion liquid containing the first material and the particles dispersed therein is coated on a surface of a substrate at a temperature, at which the particle dispersion liquid is in a sol state. In FIG. 3, the state where this step is carried out is shown in the column of "During Applying Step of Particle Dispersion Liquid (1)".

The substrate in the production method of the invention is such a concept that includes not only a flat plate, which is generally referred to as a substrate, but also a substrate having formed on a surface thereof one or more layers, and a flat plate formed of one or more layers without any plate that can be referred to as a substrate. In other words, the substrate in the production method of the invention is any material that has a target surface, on which the particle dispersion layer and the coated layer are to be formed by the production method of the invention.

The first has been described for the laminated body. The particle dispersion liquid contains the first material having dispersed therein the particles to be dispersed. In the case where the substance to be the particles does not have the desired particle diameter, the substance to be the particles is emulsified in the first material by a known emulsification method to prepare the particle dispersion liquid. In the case where the substance to be the particles already has the desired particle diameter, the substance and the first material are simply mixed by a known mixer or mixed manually to prepare the particle dispersion liquid.

The mixing ratio of the particles and the first material in this case is preferably controlled appropriately corresponding to such parameters as the diameter of the particles, the arrangement of the particles, i.e., in a single layer or a multilayer structure, the target thickness of the particle dispersion layer to be formed, and the purpose of the laminated body.

In this production step as shown in FIG. 3, the particle dispersion liquid is made at a temperature, at which the particle dispersion liquid is in a soft sol state (in the strict meaning, the first material is in a sol state, and the particles are dispersed therein), and then is coated on the surface of the substrate as the target of applying.

The applying method of the particle dispersion liquid on the surface of the substrate is not particularly limited, and the particle dispersion liquid is preferably coated by using a known equipment capable of applying a liquid to a desired wet thickness, such as an applicator, an edge coater, a screen coater, a roll coater, a curtain coater, a die coater and a slide coater. It is necessary to heat the particle dispersion liquid to a temperature, at which the particle dispersion liquid is in a sol state, to make the particle dispersion liquid in a sol state having flowability, and in the case where gelatin is used as the first material, for example, the temperature of the particle dispersion liquid is preferably from 30 to 70° C.

In the case where the light modulation layer and the protective layer of the light modulation device of the invention are formed by the production method of the invention, a display layer applying liquid for forming the light modulation layer (liquid crystal layer) is used as the particle dispersion liquid and is coated on the surface of the substrate. The display layer applying liquid contains the first material and particles containing a light modulation substance or a microencapsulated light modulation substance dispersed in the first material.

The light modulation substance may be those capable of changing the reflection, transmission or absorption state of incident light, and examples thereof include a liquid crystal material, an electrophoretic material, a photochromic material, an electrochromic material, a thermochromic material, an electrolytic deposition material, a twisted ball and an electronic powder fluid, with a cholesteric liquid crystal being particularly preferred. In the case where a liquid crystal is used, the light modulation substance is dispersed in the form of liquid crystal droplets in the display layer applying liquid, and the microencapsulated light modulation substance is dispersed in the form of liquid crystal microcapsules in the display layer applying liquid.

The method for preparing the display layer applying liquid in the case where a cholesteric liquid crystal is used as the light modulation substance will be described below.
(Preparation of Liquid Crystal Droplet Emulsion)

The liquid crystal droplet emulsion is prepared by emulsifying a dispersion phase containing at least a cholesteric liquid crystal in a continuous phase that is not compatible with the dispersion phase, for example, by emulsifying the dispersion phase to a droplet form in an aqueous phase. The liquid constituting the continuous phase may be a solvent or a part thereof for the display layer applying liquid (i.e., the particle dispersion liquid referred in the production method of the invention).

As a method for emulsification, such methods may be employed as a method of mixing the dispersion phase and the continuous phase and the dispersing the dispersion phase to a minute liquid droplets with a mechanical shearing force of a homogenizer or the like, and a membrane emulsification method of extruding the dispersion phase into the continuous phase through a porous membrane to form minute liquid droplets. In particular, the membrane emulsification method is preferred since liquid droplets having a uniform particle diameter can be obtained with a small fluctuation in particle diameter of the emulsified liquid droplets. Upon emulsification, a slight amount of a surfactant or a protective colloid for stabilizing emulsification may be added to the continuous phase.
(Preparation of Liquid Crystal Microcapsule Slurry)

In the case where liquid crystal microcapsules having a polymer shell and a cholesteric liquid crystal encompassed therein is prepared, such a known microencapsulating method may be employed as a phase separation method, an interface polymerization method and an in situ polymerization method. Specifically, the following methods may be employed: the liquid crystal droplets thus prepared above are dispersed in a solution containing a polymer shell material, and the polymer shell material having been phase-separated through coacervation is aggregated around the liquid crystal droplets; a low molecular weight material has been dissolved in the liquid crystal droplets and the solution, and the material is polymerized at the interface between them to form a shell; and a low molecular weight material and a catalyst have been dissolved in one of the liquid crystal droplets and the solution, and the low molecular weight material is polymerized by hating to form a shell.

Examples of the polymer shell include materials that are not dissolved in the liquid crystal material to be encompassed therein, such as gelatin, a cellulose derivative, gelatin-gum arabic, gelatin-Gellan gum, gelatin-peptone, gelatin-carboxymethyl cellulose, polystyrene, polyamide, nylon, polyester, polyphenylester, polyurethane, polyurea, a melamine-formalin resin, a phenol-formalin resin, a urea-formalin resin, an acrylate resin and a methacrylate resin.
(Concentration)

The liquid crystal droplet emulsion or the liquid crystal microcapsule slurry thus prepared above is concentrated in the case where the concentration of the non-volatile components is low to fail to obtain the concentration of the non-volatile components that is necessary for the display layer applying liquid upon applying. Specific examples of the concentrating method include a method of removing the continuous phase by standing still or centrifuging the emulsion or slurry with utilization of difference in specific gravity between the liquid crystal droplets or the liquid crystal microcapsules and the continuous phase, and a method of removing the continuous phase by filtering the emulsion or slurry with a membrane filter.
(Preparation of Display Layer Applying Liquid)

The first material, such as gelatin, is added to the liquid crystal droplet emulsion or the liquid crystal microcapsule slurry thus prepared and concentrated depending on necessity, to prepare the display layer applying liquid.

In order to coat the liquid crystal droplets or the liquid crystal microcapsules in the form of a closely packed single layer, it is preferred that the contents of the components in the liquid crystal droplet emulsion or the liquid crystal microcapsule slurry are measured by using a density meter or a specific gravity meter, and the mixing ratio of the non-volatile component of the first material, such as gelatin, of the display layer applying liquid and the liquid crystal droplets or the liquid crystal microcapsules is controlled.

The ratio $A_L$ of the liquid crystal droplets or the liquid crystal microcapsules to the coated area is shown by the following expression (1):

$$A_L = (3/2) \cdot (t_w \cdot Sr \cdot Lr / D_L) \quad (1)$$

wherein Sr represents the ratio (volume ratio) of the volume of the non-volatile component to the volume of the display layer applying liquid; Lr represents the ratio (volume ratio) of the volume of the liquid crystal droplets or the liquid crystal microcapsules to the volume of the non-volatile component; $D_L$ represents the average particle diameter (μm) of the liquid crystal droplets or the liquid crystal microcapsules; and $t_W$ represents the wet applying thickness (μm) on the substrate. The display layer applying liquid is prepared preferably to have $A_L$ satisfying the following expression (2):

$$0.8 < A_L < 1.0 \quad (2)$$

The ratio (volume ratio) Sr of the volume of the non-volatile component to the volume of the display layer applying liquid means Sr=Y/X, wherein Y mL of the non-volatile component remains after evaporating the solvent from X mL of the display layer applying liquid, and the ratio (volume ratio) Lr of the volume of the liquid crystal droplets or the liquid crystal microcapsules to the volume of the non-volatile component means Lr=Z/Y, wherein Y mL of the non-volatile component contains Z mL of the liquid crystal droplets or the liquid crystal microcapsules.

In order to prevent breakage due to pressure or the like, the ratio (volume ratio) Lr of the volume of the liquid crystal droplets or the liquid crystal microcapsules to the volume of the non-volatile component is preferably 0.9 or less.

Based on the mixing ratio thus calculated, the display layer applying liquid is prepared by controlling the mixing amounts of the non-volatile component, such as gelatin, of the first material and the solvent to the liquid crystal droplet emulsion or the liquid crystal microcapsules slurry. At this time, a slight amount of a known property improving agent, such as a thickening agent, a wettability improving agent, a defoaming agent and a drying rate controlling agent, may be added to the liquid.

The solvent used upon preparing the display layer applying liquid dissolves the first material, such as gelatin, and does not dissolves the liquid crystal in the case using the liquid crystal droplets, or does not dissolves the polymer shell of the liquid crystal microcapsules in the case using the liquid crystal microcapsules. Preferred examples of the solvent include water and a mixture of water and an alcohol, such as methanol, ethanol and glycol.

(2) Cooling Step of Particle Dispersion Liquid

In the cooling step of a particle dispersion liquid, the particle dispersion liquid coated in the applying step of the particle dispersion liquid (1) is cooled to a temperature, at which the particle dispersion liquid is in a gel state. In FIG. 3, the state where this step is completed is shown in the column of "After completing Cooling Step of Particle Dispersion Liquid (2)".

As shown in FIG. 3, in this step, the particle dispersion liquid coated on the surface of the substrate is cooled to a temperature, at which the particle dispersion liquid is in a stiff gel state (in the strict meaning, the first material is in a gel state, and the particles are dispersed therein).

The cooling method may be an annealing operation by simply allowing to stand the applying liquid in the case where the gelation temperature (the maximum temperature where the gel state is maintained) is higher than the environmental temperature, and the applying liquid may be positively cooled with a cooling equipment, such as a low temperature oven, a cold air blow and a cooling plate.

(3) Applying Step of Coated Layer Applying Liquid

In the case where the cooling step of a particle dispersion liquid is included, the coated layer applying liquid containing the second material is coated on the particle dispersion liquid at a temperature, at which the particle dispersion liquid is in a gel state, at a temperature, at which the coated layer applying liquid is in a sol state, in the applying step of a coated layer applying liquid. In FIG. 3, the state where this step is carried out is shown in the column of "During Applying Step of Coated Layer Applying Liquid (3)".

The second material has been described for the laminated body. The second material may be used as it is as the coated layer applying liquid, and a slight amount of a known property improving agent, such as a thickening agent, a wettability improving agent, a defoaming agent and a drying rate controlling agent, may be added to the liquid depending on necessity.

As the method for applying the coated layer applying liquid on the particle dispersion liquid in a gel state on the surface of the substrate, the applying methods described for the applying step of a particle dispersion liquid (1) can be employed. It is necessary that the coated layer applying liquid is at the minimum temperature $T_3$ where the coated layer applying liquid maintains a sol state, so as to make the coated layer applying liquid in a sol state having flowability (see FIG. 2). In the case where agar is used as the second material, for example, the temperature of the coated layer applying liquid is preferably from 30 to 70° C. while it varies depending on the species of the material.

In this step, the coated layer applying liquid is coated while the state obtained by cooling in the cooling step of a particle dispersion liquid (2) is maintained (provided that a temperature change within a range where the sol and gel states of the particle dispersion liquid and the coated layer applying liquid are maintained is allowable). As shown in FIG. 3, the particle dispersion liquid having been coated on the surface of the substrate is in a stiff gel state in this step, and the coated layer applying liquid in a soft sol state is then coated thereon.

In this step, the particle dispersion liquid having been coated is at a low temperature and in a three-dimensionally crosslinked stiff gel state, and the coated layer applying liquid to be laminated thereon is at a high temperature and in a sol state suitable for applying. The coated layer applying liquid thus coated on the cooled particle dispersion liquid is changed to a gel state immediately after applying. Accordingly, even when the coated layer applying liquid is coated in this step, such phenomena do not occur that the particle dispersion liquid flows due to the shearing force caused by applying the coated layer applying liquid to make the thickness thereof uneven, and the layers are mixed with each other by migrating the solid content of the particle dispersion liquid to the coated layer applying liquid, or migrating the solid content of the coated layer applying liquid to the particle dispersion liquid.

After completing this step and before the next temperature increasing step (5), it is necessary to provide the state shown in the column of "Before Temperature Increasing Step (5)" in FIG. 3, i.e., not only the particle dispersion liquid having been coated, but also the coated layer applying liquid thus laminated are in a gel state, i.e., in a hardened state.

As having been described, the coated layer applying liquid is changed to a gel state immediately after applying, and therefore, in the case where the coated layer applying liquid is sufficiently decreased in temperature after completing this step, the next temperature increasing step (5) may be carried out as it is. However, in the case where the coated layer applying liquid and the resin particle dispersion liquid upon applying are high in temperature, it is preferred to carried out the cooling step of a coated layer applying liquid (4) (which is not shown in FIG. 3) before the temperature increasing step (5). By carrying out the cooling step of the coated layer applying liquid (4), for example, the coated layer applying liquid can be subjected to the temperature increasing step in such a state that the coated layer applying liquid is infallibly at a temperature lower than the maximum temperature $T_4$ where the coated layer applying liquid maintains a gel state upon decrease in temperature (i.e., the temperature, at which the liquid is gelled upon decrease in temperature).

As the cooling method in the cooling step of a coated layer applying liquid (4), those similar to the cooling step of a resin particle dispersion liquid (2) may be employed, such as an annealing operation by simply allowing to stand the applying liquid, and a positive cooling operation with a cooling equipment, such as a low temperature oven, a cold air blow and a cooling plate. In the case where a cold air blow is used for cooling, the coated layer is subjected to a cold air blow preferably immediately after completing the applying operation since it is desired that the state shown in the column of "Before Temperature Increasing Step (5)" in FIG. 3 is provided as soon as possible.

(5) Temperature Increasing Step

In the temperature increasing step, both the applying liquids, which have been coated and laminated on the surface of the substrate in the steps of from the applying step of a particle dispersion liquid (1) to the applying step of a coated layer applying liquid (3) (and the cooling step of a coated layer applying liquid (4) if any), and which may be referred to as a coated layer, are increased in temperature to a temperature, at which the coated layer applying liquid is in a gel state, and the particle dispersion liquid is in a sol state. In FIG. 3, the state after completing this step is shown in the column of "After Completing Temperature Increasing Step (5)".

In this step, as shown in FIG. 3, the temperature is increased to a temperature, at which the particle dispersion liquid coated on the surface of the substrate is in a soft sol state (in the strict meaning, the first material is in a sol state, and the particles are dispersed therein), and the coated layer applying liquid coated thereon is in a gel state. In the production method of the invention, it is important that the applying liquids are once in the state shown in the column of "Before Temperature Increasing Step (5)" in FIG. 3, and then are made in the state shown in the column of "After Completing Temperature Increasing Step (5)" in FIG. 3 in this step.

Accordingly, in the production method of the invention, it is not necessary to use the materials that have the characteristics shown in the description for the laminated body, as long as the states of the materials can be controlled as described above. For example, the second material may not necessarily show a pronounced hysteresis behavior in sol-gel change upon change in temperature, and it is sufficient that the coated layer applying liquid is in a gel state while the particle dispersion liquid is in a sol state.

The second material is preferably a solution containing agar or a derivative thereof and a solvent to show a pronounced hysteresis behavior, and the first material is preferably a solution containing gelatin or a derivative thereof and a solvent, as similar to the laminated body of the invention. The other preferred properties, characteristics and specific materials of the first and second materials are also the same as those for the laminated body of the invention.

Examples of the heating equipment used for increasing the temperature (heating) in this step include a convection electric heating equipment, such as an oven and a hot air blow, a transmission heating equipment, such as a hot plate and a heating drum, and a radiation heating equipment, such as an infrared ray heater.

(6) Drying Step for Hardening

In the drying step for hardening, the temperature thus increased in the temperature increasing step (5) is maintained to dry and harden the both liquid shaving been coated. Upon maintaining the temperature, a temperature change within a range where the coated layer applying liquid is in a gel state, and the particle dispersion liquid is in a sol state is allowable.

The drying and hardening temperature is necessarily such a temperature that satisfies the aforementioned temperature conditions and is higher than the solidifying points of the coated layers, and in the case where gelatin is used as the first material, and agar is used as the second material, for example, the temperature of the coated layers is preferably from 40 to 90° C. The preferred temperature range is also applicable to the temperature, which is increased in the temperature increasing step (5).

As described for the temperature increasing step (5), since the coated layer applying liquid as the upper layer of the coated layers is in a three-dimensionally crosslinked stiff gel state, such phenomenon does not occur that the layers are mixed with each other by migrating the solid content of the particle dispersion liquid to the coated layer applying liquid, or migrating the solid content of the coated layer applying liquid to the particle dispersion liquid. Furthermore, since the particle dispersion liquid as the lower layer is dried and hardened in a soft sol state, the positional relationship of the particles having been uniformly dispersed in the particle dispersion liquid is gradually changed to an in-plane uniform arrangement through evaporation of the solvent.

At this time, the function of the colloid solution, in which it is considered that the mechanism of pressing the particles contained thereonto is exhibited, and since the particle dispersion liquid is covered with the film of the coated layer applying liquid in a gel state as the upper layer, it is considered that the film accelerates the function of pressing the particles in the particle dispersion liquid upon drying for hardening, whereby the particles are changed into an in-plane uniform arrangement without unevenness. In the case where soft spherical particles are dispersed, in particular, the particles can be changed to a polyhedral column shape. Furthermore, the particles can be arranged in the form of a closely packed single layer by appropriately controlling the mixing ratio of the particles in the particle dispersion liquid.

The state after completing this step is shown in the column of "After Completing Drying Step for Hardening (6) (finished)" in FIG. 3.

As shown in FIG. 3, after completing this step, the particle dispersion liquid and the coated layer applying liquid are dried to a solid state to form the particle dispersion layer and the coated layer, respectively, and thus the laminated body is completed. The resulting laminated body contains the particles in an in-plane uniform arrangement without unevenness (in the example shown in FIG. 3, the particles are arranged in the form of a closely packed single layer).

As the production method of the invention has been described in detail with reference to FIG. 3, according to the production method of the invention, the particle dispersion liquid and the coated layer applying liquid laminated on each other are in a hardened gel state before the temperature increasing step (5), and then the coated layer applying liquid remains in a gel state, but only the particle dispersion liquid is in a sol state having flowability, by the temperature increasing step (5), followed by being subjected to the drying step for hardening (6).

Figure 4:
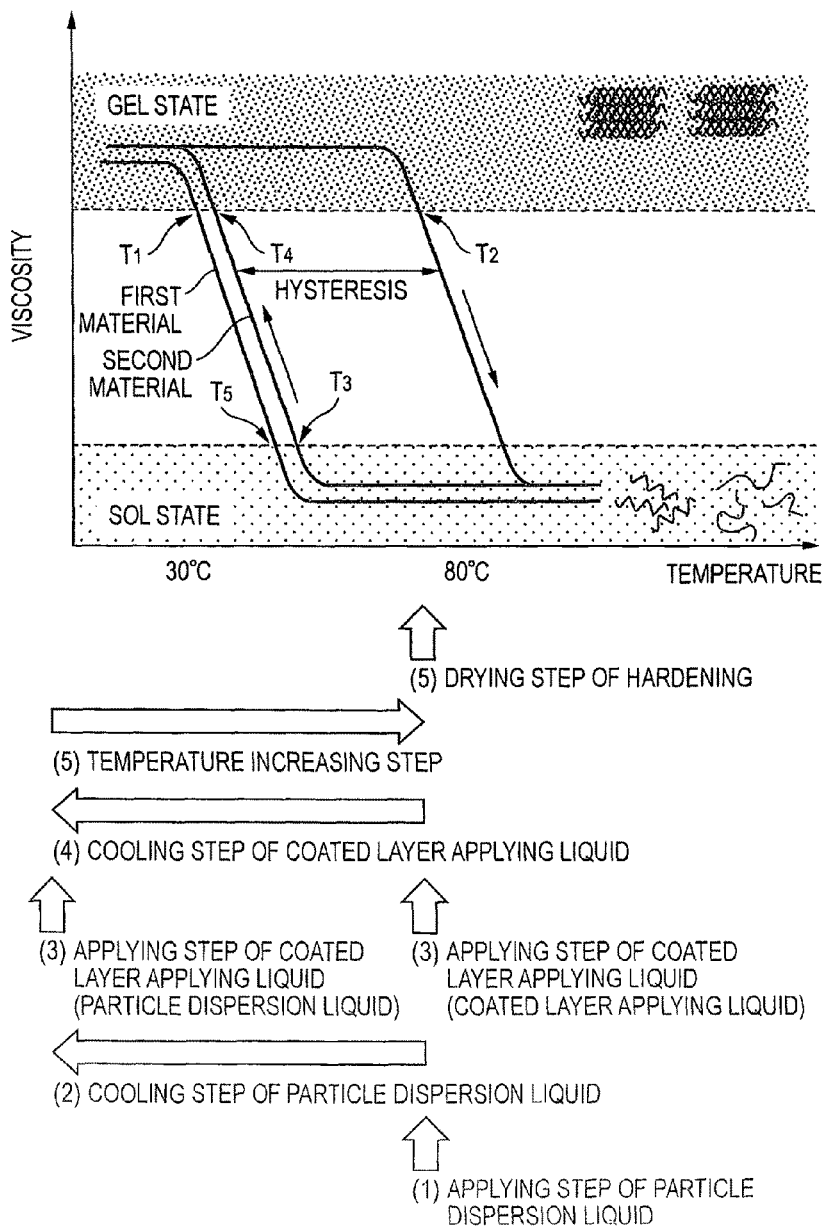
FIG. 4 is a graph showing change in state of the first material and the second material exhibiting ideal temperature-viscosity characteristics with respect to the temperature, in which the abscissa indicates the temperature, and the ordinate indicates the viscosity.

FIG. 4 is a graph showing change in state of the first material and the second material used in the production method of the invention with respect to the temperature. The graph shows relationship between the temperature as the abscissa and the viscosity as the ordinate of the first material and the second material that exhibit ideal temperature-viscosity characteristics, and the materials that can be used in the invention may have such characteristics that are slightly deviated from the ideal change in viscosity shown in the graph.

Under the graph, the temperatures in the respective steps including the cooling step of a particle dispersion liquid are shown with white hollow arrows (abscissa). The horizontal arrows show change in temperature.

As shown in the graph of FIG. 4, the operation of the applying step of a particle dispersion liquid (1) is carried out at a temperature, at which the first material is in a sol state, and the particle dispersion liquid is cooled to a temperature, at which the first material is in a gel state, in the cooling step of the particle dispersion liquid (2). Thereafter, the operation of the applying step of a coated layer applying liquid (3) is carried out at a temperature, at which the coated layer applying liquid is in a sol state while maintaining the temperature of the particle dispersion liquid (i.e., the temperature, at which the first material is in a gel state), and then the operation of the cooling step of a coated layer applying liquid (4) is carried out depending on necessity, or no operation is carried out, to make the coated layer applying liquid in a gel state. The coated layers are then increased in temperature in the temperature increasing step (5) to a temperature, at which the first material is in a sol state while the second material maintains a gel state, and the layers are dried for hardening in the drying step for hardening (6) with the temperature maintained. The sequence of steps of the production method of the invention containing the cooling step of a particle dispersion liquid has been described.

(Case that Contains Preliminary Hardening Step)

FIG. 5 is a table showing the production steps of the production method of a laminated body according to the invention containing a preliminary hardening step with the laminated body shown in FIG. 1 as an example, in which the states of the appearance (cross section) and the layers are schematically shown for the steps, respectively. The production steps will be described below.

(1) Applying Step of Particle Dispersion Liquid

In the applying step of a particle dispersion liquid, a particle dispersion liquid containing the first material and the particles dispersed therein is coated on a surface of a substrate at a temperature, at which the particle dispersion liquid is in a sol state. In FIG. 5, the state where this step is carried out is shown in the column of "During Applying Step of Particle Dispersion Liquid (1)".

Detailed description of this step is omitted herein since this step is the same as that in the case that contains the cooling step of a resin particle dispersion liquid.

(2') Preliminary Hardening Step

In the preliminary hardening step, the particle dispersion liquid coated in the applying step of a particle dispersion liquid (1) is dried for hardening until the particle dispersion liquid is in a hardened state. The state after completing this step is shown in the column of "After Completing Preliminary Hardening Step (2')" in FIG. 5.

As shown in FIG. 5, the particle dispersion liquid coated on the surface of the substrate is dried until the particle dispersion liquid is in a hardened state (in the strict meaning, the first material is in a hardened state, and the particles are dispersed therein). The drying operation may be generally carried out until the final layer (resin dispersion layer) is completed as similar to the drying step for hardening (6) described for the case that contains the cooling step of a particle dispersion liquid. However, the particle dispersion liquid may not be generally dried for hardening until the layer is completed since the particle dispersion liquid is again changed to a sol state in the temperature increasing step (5). Specifically, for example, it is sufficient that the particle dispersion liquid is dried until the particle dispersion liquid has such a viscosity that is equivalent to the particle dispersion liquid in a gel state.

In the case where the particle dispersion liquid is heated to a temperature higher than the hardening point (melting point), the temperature of the coated layer in the drying step for hardening is preferably from 30 to 70° C. when gelatin, for example, is used as the first material.

The heating equipment used for heating for drying in this step may be the same as those described for the temperature increasing step (5) of the case that contains the cooling step of a particle dispersion liquid.

In the case where the particle dispersion liquid is heated or cooled to a temperature lower than the hardening point (melting point), on the other hand, the temperature of the coated layer is preferably from 10 to 30° C. when gelatin, for example, is used as the first material.

The heating equipment used for heating for drying in this step may be the same as those described for the temperature increasing step (5) of the case that contains the cooling step of a particle dispersion liquid. The cooling equipment for cooling for drying in this step may be the same as those described for the cooling step of a coated layer applying liquid (4) of the case that contains the cooling step of a particle dispersion liquid.

(3) Applying Step of Coated Layer Applying Liquid

In the case where the preliminary hardening step (2') is contained, the coated layer applying liquid containing the second material is coated on the particle dispersion liquid in a hardened state while the coated layer applying liquid is in a sol state. In FIG. 5, the state where this step is carried out is shown in the column of "During Applying Step of Coated Layer Applying Liquid (3)".

Detailed description of the applying step of a coated layer applying liquid (3) is omitted herein since this step is the same as that in the case that contains the cooling step of a resin particle dispersion liquid.

The temperature of the particle dispersion liquid in a hardened state, on which the coated layer applying liquid is to be coated in this step, may be a high temperature after heating for drying and hardening in the preliminary hardening step (2') or a low temperature after cooling. In the case where the temperature is higher than the minimum temperature $T_5$ where the first material is in a sol state, it is preferred that the temperature is lowered before starting admixture of the layers due to dissolution thereof caused by the change of the particle dispersion liquid to a sol state through migration of the solvent from the coated layer applying liquid.

From the standpoint of the aforementioned phenomenon, it is preferred to carry out the operation of the cooling step of a coated layer applying liquid (4) before the next temperature increasing step (5), which is not shown in FIG. 5. In the case where the cooling step of a coated layer applying liquid (4) is carried out, for example, the coated layer applying liquid can be subjected to the temperature increasing step in such a state that the coated layer applying liquid is infallibly at a temperature lower than the maximum temperature $T_4$ where the coated layer applying liquid maintains a gel state upon decrease in temperature (i.e., the temperature, at which the liquid is gelled upon decrease in temperature).

Detailed description of the cooling step of a coated layer applying liquid (4) is omitted herein since this step is the same as that in the case that contains the cooling step of a resin particle dispersion liquid.

(5) Temperature Increasing Step

In the temperature increasing step, both the applying liquids, which have been coated and laminated on the surface of the substrate in the steps of from the applying step of a particle dispersion liquid (1) to the applying step of a coated layer applying liquid (3) (and the cooling step of a coated layer applying liquid (4) if any), are increased in temperature to a temperature, at which the coated layer applying liquid is in a gel state, and the particle dispersion liquid is in a sol state, as similar to the case that contains the cooling step of a particle dispersion liquid. In FIG. 5, the state after completing this step is shown in the column of "After Completing Temperature Increasing Step (5)".

In the case that contains the preliminary hardening step (2'), after completing the temperature increasing step (5), the particle dispersion liquid is in a sol state, and the coated layer applying liquid is in a gel state, as similar to the case that contains the cooling step of a particle dispersion liquid shown in FIG. 3 although the particle dispersion liquid is in a form of a thin film in this case as shown in FIG. 5. Accordingly, the film of the particle dispersion liquid, which has been in a hardened state before this step, becomes a sol state having flowability, which is covered with the coated layer applying liquid in a gel state as a hardened film.

Detailed description of the temperature increasing step (5) is omitted herein since this step is the same as that in the case that contains the cooling step of a resin particle dispersion liquid.

(6) Drying Step for Hardening

In the drying step for hardening, the temperature thus increased in the temperature increasing step (5) is maintained to dry and harden the both liquids having been coated. The state after completing this step is shown in the column of "After Completing Drying Step for Hardening (6) (finished)" in FIG. 5.

Detailed description of the drying step for hardening (6) is omitted herein since this step is the same as that in the case that contains the cooling step of a resin particle dispersion liquid.

As having been described, in the case that contains the preliminary hardening step (2'), the particle dispersion liquid is in a sol state having flowability after completing the temperature increasing step (5) while it is in the form of a thin film, and the coated layer applying liquid in a gel state as a hardened film covers thereon. Accordingly, the particles having been once fixed in arrangement in the preliminary hardening step (2') are again rearranged in position in this drying step for hardening (6). Specifically, since the particle dispersion liquid as the lower layer is dried and hardened in a sol state having flowability, the positional relationship of the particles is gradually changed to an in-plane uniform arrangement through evaporation of the solvent. It is considered that the mechanism of pressing the particles by the film of the coated layer applying liquid is the same as in the case that contains the cooling step of a particle dispersion liquid, and it is also similar to the case that contains the cooling step of a particle dispersion liquid that the particles can be changed to a polyhedral column shape, and can be arranged in the form of a closely packed single layer.

(Case that does not Contain both Cooling Step of Particle Dispersion Liquid and Preliminary Hardening Step)

It is effective from the standpoint of selecting the second material and the first material and obtaining wide production conditions that after the applying step of a particle dispersion liquid, the particle dispersion liquid is changed into a gel state or a dried state through the cooling step of a particle dispersion liquid or the preliminary hardening step, and then the coated layer applying liquid is coated thereon.

However, these steps are not always necessary as long as the particle dispersion liquid and the coated layer applying liquid are not mixed until the temperature increasing step. For example, even in the case where both the second material and the first material are in a sol state upon laminating, the layers may be subjected to the temperature increasing step (5) as long as the materials do not have high compatibility, or the layers are changed into a gel state before the materials are mixed.

FIG. 6 is a table showing the production steps of the production method of a laminated body according to the invention that does not contain the cooling step of a particle dispersion liquid and the preliminary hardening step with the laminated body shown in FIG. 1 as an example, in which the states of the appearance (cross section) and the layers are schematically shown for the steps, respectively.

The production steps are different from the case that contains the cooling step of a particle dispersion liquid only in the part between the applying step of a particle dispersion liquid (1) and the temperature increasing step (5), and therefore, only the part (mainly the applying step of a coated layer applying liquid (3)) is described, but descriptions for the other steps in the case that contains the cooling step of a particle dispersion liquid are used for the steps in this case.

In the case that does not contain the cooling step of a particle dispersion liquid and the preliminary hardening step, the particle dispersion liquid is coated in the applying step of a particle dispersion liquid (1), and then the applying step of a coated layer applying liquid (3) is carried out to coat the coated layer applying liquid thereon in a wet-on-wet state. In FIG. 6, the state where the applying step of a coated layer applying liquid (3) is carried out is shown in the column of "During Applying Step of Coated Layer Applying Liquid (3)".

In this case, the coated layer applying liquid in a sol state is coated on the particle dispersion liquid in a sol state, and if the state after completing the step is maintained for a long period of time, the layers are mixed due to dissolution between them. However, the admixture of the layers is not started immediately after applying, but proceeds gradually. Therefore, in the case where the layers are rapidly changed to a gel state (hardened state) when the admixture is not started, or the admixture occurs only slightly (both cases of which are referred to as "before mixing"), the temperature increasing step (5) and steps subsequent thereto can be carried out similarly to the case that contains the cooling step of a particle dispersion liquid, so as to obtain the advantages of the invention similarly. In other words, both the particle dispersion liquid and the coated layer applying liquid thus coated in the state shown in the column of "Before Temperature Increasing Step (5)" in FIG. 6 are changed into a hardened gel state before mixing the layers.

For example, in the case where the substrate, on which the layers are coated, is at a sufficiently low temperature, the temperatures of the particle dispersion liquid and the coated layer applying liquid are rapidly lowered upon applying them to be changed from a sol state to a gel state, whereby the state shown in the column of "Before Temperature Increasing Step (5)" is obtained. Furthermore, the operation of the cooling step of a coated layer applying liquid (4) may be carried out after, preferably immediately after, completing the operation of the applying step of a coated layer applying liquid (3). Detailed description of the cooling step of a coated layer applying liquid (4) is omitted herein since this step is the same as that in the case that contains the cooling step of a resin particle dispersion liquid.

The expression that the admixture occurs only slightly means that the admixture of the layers occurs to only such an extent or less that adversely affects the intended capability of the laminated body obtained finally. Accordingly, the extent of admixture cannot be determined unconditionally, but the admixture is preferably prevented as much as possible. The period of time from the applying operation of the coated layer applying liquid to the state shown in the column of "Before Temperature Increasing Step (5)" in FIG. 6 cannot be determined unconditionally since it largely varies depending on such conditions as the materials of the liquids, the coated amounts thereof, and the intended capability of the laminated body, but the period of time is preferably as short as possible.

It is important in this case that the state where the particle dispersion liquid and the coated layer applying liquid are laminated is changed to the state shown in the column of "Before Temperature Increasing Step (5)" in FIG. 6 before the layers are mixed with each other. This is basically the same as in the other cases. For example, in the case that contains the cooling step of a particle dispersion liquid, the particle dispersion liquid is changed into a gel state, and in the case that contains the preliminary hardening step, the particle dispersion liquid is changed into a hardened state, followed by applying the coated layer applying liquid thereon, whereby the admixture of the layers is prevented from occurring. In this case, on the other hand, the period of time after laminating the layers is controlled to short, whereby the state shown in the column of "Before Temperature Increasing Step (5)" in FIG. 6 is obtained before the layers are mixed with each other.

Accordingly, in this case, the applying step of a particle dispersion liquid (1) and the applying step of a coated layer applying liquid (3) can be carried out continuously, and such an advantage is obtained that the extra step, such as the cooling step of a particle dispersion liquid (2) and the preliminary hardening step (2'), may not be necessarily carried out between the steps, so as to make the production method simple. However, there is a temporal restriction that the state shown in the column of "Before Temperature Increasing Step (5)" in FIG. 6 is necessarily obtained before the layers are mixed with each other.

In the case where the cooling step of a particle dispersion liquid (2) or the preliminary hardening step (2') is carried out between the applying step of a particle dispersion liquid (1) and the applying step of a coated layer applying liquid (3), on the other hand, such an advantage is obtained that the admixture of the layers can be prevented from occurring at a high level.

In this case, owing to the advantage that the applying step of a particle dispersion liquid (1) and the applying step of a coated layer applying liquid (3) can be carried out continuously, the applying operations of these steps can be carried out substantially simultaneously.

Figure 7:
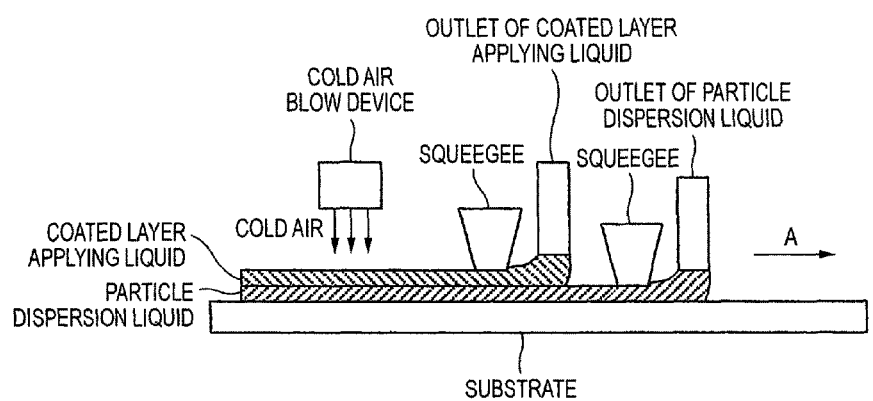
FIG. 7 is a schematic diagram showing an example where the operation of the applying step of a coated layer applying liquid is carried out during the applying step of a particle dispersion liquid.

FIG. 7 is a schematic diagram showing an example where the operation of the applying step of a coated layer applying liquid is carried out during the applying step of a particle dispersion liquid. In the example shown in FIG. 7, while not shown in the figure, an outlet of the particle dispersion liquid, an outlet of the coated layer applying liquid, two squeegees and a cold air blow device are integrally assembled and moved to carry out the applying operations, and the applying operation of the applying step of a particle dispersion liquid and the applying operation of the applying step of a coated layer applying liquid are carried out substantially simultaneously. In alternative, a substrate may be moved with respect to the outlet of the particle dispersion liquid, the outlet of the coated layer applying liquid, the two squeegees and the cold air blow device, which are fixed, to carry out the applying operations.

As shown in FIG. 7, in this example, the particle dispersion liquid is fed from the outlet of the particle dispersion liquid, which is being moved in the direction shown by the arrow A along the surface of the substrate, and smoothed with the squeegee to form a coated layer, and continuously thereon, the coated layer applying liquid is fed from the outlet of the coated layer applying liquid and smoothed with the squeegee to form a coated layer, whereby the coated layers are formed at a time. Accordingly, the applying operation of the applying step of a particle dispersion liquid and the applying operation of the applying step of a coated layer applying liquid are carried out substantially simultaneously, whereby the applying operations are simplified, and the applying time is shortened.

The concept of "substantially simultaneously" also include such a case that the applying operations of the layers are carried out completely simultaneously, for example, the outlets that discharge the particle dispersion liquid and the coated layer applying liquid in parallel to the surface of the substrate are arranged perpendicular to the surface of the substrate, and the particle dispersion liquid and the coated layer applying liquid are directly laminated on each other at a time.

As having been described, the applying step of a particle dispersion liquid and the applying step of a coated layer applying liquid may not be steps independent from each other, and may be steps that are carried out substantially simultaneously.

Even in the case where the applying operation of the applying step of a particle dispersion liquid and the applying operation of the applying step of a coated layer applying liquid are carried out substantially simultaneously, it is important that the layers laminated to each other are changed to the state shown in the column of "Before Temperature Increasing Step (5)" in FIG. 6 before the layers are mixed with each other, and the cooling step of a coated layer applying liquid (4) may be carried out depending on necessity. In the example shown in FIG. 7, in order to cool the coated layers rapidly after laminating the layers, cold air blow is effected with a cold air blow device as the operation of the cooling step of a coated layer applying liquid (4).

In the example shown in FIG. 7, each of the liquids is fed from the outlets and smoothed with the squeegees as an example, but the methods therefor are not limited thereto, and any applying method may be employed. Furthermore, cold air blow is employed as the cooling method as an example, but the method is not limited thereto, and any method may be employed.

(Light Modulation Device)

The light modulation device of the invention contains at least between a pair of electrodes, a light modulation layer containing a first material that is changed from a gel state to a sol state upon increase in temperature and particles containing a light modulation substance or a microencapsulated light modulation substance dispersed in the first material, and a protective layer containing a second material that is changed from a gel state to a sol state upon increase in temperature, is changed from a sol state to a gel state upon decrease in temperature, and shows a hysteresis behavior in sol-gel change upon change in temperature.

The light modulation device of the invention is one exemplary embodiment of the laminated body of the invention, in which the light modulation layer of the light modulation device of the invention corresponds to the particle dispersion layer of the laminated body of the invention, and the protective layer of the light modulation device corresponds to the coated layer of the laminated body. The particles dispersed in the light modulation layer are particles containing a light modulation substance or a microencapsulated light modulation substance.

The light modulation device of the invention will be described in more detail below with reference to three exemplary embodiments, in which the light modulation layer and the protective layer are described supplementarily, and the other constitutional elements are described in detail.

First Exemplary Embodiment

Figure 8:
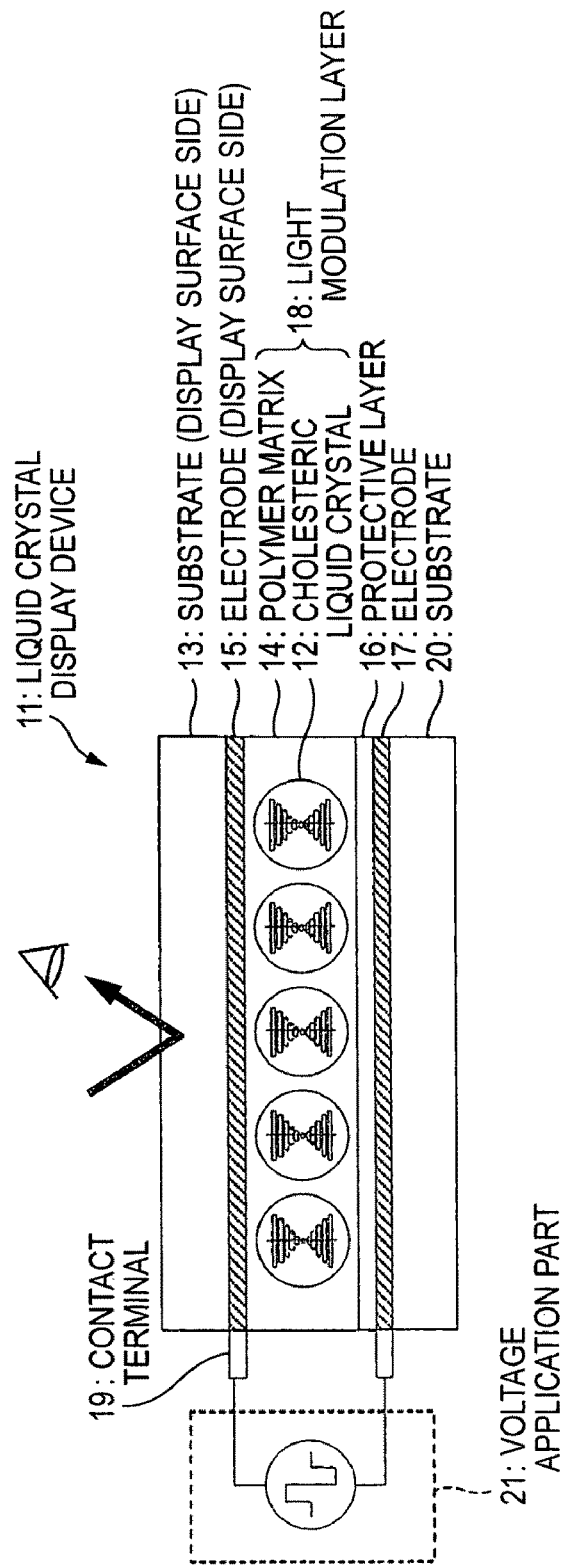
FIG. 8 is a schematic constitutional view showing a first exemplary embodiment as an example of the light modulation device of the invention.

FIG. 8 is a schematic constitutional view showing a first exemplary embodiment as an example of the light modulation device of the invention.

In the light modulation device of the exemplary embodiment, the light modulation layer (liquid crystal layer) is selectively driven by selective application of a driving signal.

In the exemplary embodiment, the light modulation device 11 contains, laminated in this order from the side of the display surface, a substrate 13, an electrode 15, a light modulation layer (liquid crystal layer) 18, a protective layer 16, an electrode 17 and a substrate 20. A laminate layer 28 or a colored layer (light shielding layer) 22 in a second exemplary embodiment described later may be provided between the protective layer 16 and the electrode 17.

(Substrate)

The substrates 13 and 20 are such members that hold the functional layers there inside to maintain the structure of the light modulation device 11. The substrates 13 and 20 are materials in a sheet form having a strength capable of withstanding an external force, and preferably has flexibility. Specific examples of the material include an inorganic sheet (such as glass and silicon) and a polymer film (such as polyethylene terephthalate, polysulfone, polyethersulfone, polycarbonate and polyethylene naphthalate). At least the substrate 13 on the side of the display surface has a function of transmitting display light. The substrates may have on the outer surface thereof a known functional film, such as an antifouling film, an antiwear film, an antireflection film and a gas barrier film.

(Electrode)

The electrodes 15 and 17 are such members that apply a driving voltage, which has been received from a voltage application part 21, to the functional layers in the light modulation device 11. Specific examples of the material therefor include electroconductive thin films formed of such materials as a metal (such as gold, silver, copper, iron and aluminum), a metallic oxide (such as indium oxide, tin oxide and indium tin oxide (ITO)), carbon, a composite material having these materials dispersed in a polymer, and an electroconductive organic polymer (such as a polythiophene polymer and a polyaniline polymer). The electrodes may have on the outer surface thereof a known functional film, such as an adhesiveness improving film, an antireflection film and a gas barrier film.

(Light Modulation Layer)

The light modulation layer (liquid crystal layer) in the invention contains a light modulation substance, such as a cholesteric liquid crystal, has a function of modulating reflection and transmission states of incident light with respect to an electric field, and is capable of maintaining the selected state under application of no electric field. The light modulation layer preferably has such a structure that is not deformed under application of an external force, such as bending and pressure.

The cholesteric liquid crystal 12 contains liquid crystal molecules arranged in a twisted helical form, and reflects by interference particular light depending on the helical pitch among the light incident in the direction of the helical axis. The orientation is changed with the electric field, whereby the reflection state can be changed.

Specific examples of a liquid crystal that is capable of being used as the cholesteric liquid crystal 12 include a steroid cholesterol derivative, a nematic or smectic liquid crystal (such as a Schiff base series, an azo series, an azoxy series, a benzoate ester series, a biphenyl series, a terphenyl series, a cyclohexylcarboxylate ester series, a phenylcyclohexane series, a biphenylcyclohexane series, a pyrimidine series, a dioxane series, a cyclohexylcyclohexane ester series, a cyclohexylethane series, a cyclohexane series, a tolan series, an alkenyl series, a stilbene series and a condensed polycyclic series), and a mixture thereof, to which a chiral agent (such as a steroid cholesterol derivative, a Schiff base series, an azo series, an ester series and a biphenyl series) is added.

The helical pitch of the cholesteric liquid crystal is controlled by the chemical structure of the liquid crystal molecule and the addition amount of the chiral agent with respect to the nematic liquid crystal. For example, in the case where the display color is to be blue, green or red, the center wavelength of the selective reflection is controlled to a range of from 400 to 500 nm, a range of from 500 to 600 nm and a range of from 600 to 700 nm, respectively. In order to compensate the temperature dependency of the helical pitch of the cholesteric liquid crystal, such a known measure may be employed that plural chiral agents having different torsional directions or having opposite temperature dependencies are added.

The light modulation layer is preferably formed to have a PDCLC (polymer dispersed cholesteric liquid crystal) structure, in which a cholesteric liquid crystal (including a microencapsulated cholesteric liquid crystal) is dispersed in the form of droplets in a polymer matrix, since the light modulation layer can be a self-holding type liquid crystal composite that does not deformed under application of an external force, such as bending and pressure.

The PDCLC structure is produced by the production method of the invention, to which a known method of dispersing a cholesteric liquid crystal in a polymer matrix is applied. Specifically, a cholesteric liquid crystal is dispersed as minute droplets in a water layer by extruding through a porous film, and then mixed with the first material, such as gelatin, to obtain an applying liquid, which is coated and dried according to the production method of the invention.

The polymer matrix 14 is obtained by hardening the first material. The first material and the hardening operation thereof have been described in detail above.

(Protective Layer)

The protective layer 16 is originally provided for protecting the light modulation layer 18 to prevent the protective layer 18 from being exposed to the exterior upon production of the light modulation device 11, but the protective layer 16 corresponds to the coated layer in the laminated body and the production method of the invention and exhibits the functions of the coated layer.

The protective layer 16 is obtained by hardening the second material. The second material and the hardening operation thereof have been described in detail above.

(Contact Terminal)

Contact terminals are such members that are made in contact with the voltage application part 21 and the light modulation device 11 (electrodes 15 and 17) to effect electric conduction between them, and are selected to have high electroconductivity and small contact resistances to the electrodes 15 and 17 and the voltage application part 21. The contact terminals preferably have such a structure that they can be separated from both or one of the electrodes 15 and 17 and the voltage application part 21, whereby the light modulation device 11 and the voltage application part 21 can be separated from each other.

Examples of the contact terminals 19 include members in a clip form or a connector form, which are formed of a metal (such as gold, silver, copper, iron and aluminum), carbon, a composite material having these materials dispersed in a polymer, a metallic oxide (such as indium oxide, tin oxide and indium tin oxide (ITO)), carbon, and a composite material having these materials dispersed in a polymer, and an electroconductive organic polymer (such as a polythiophene polymer and a polyaniline polymer).

(Writing of Image)

In order to write an image in the light modulation device 11 of the exemplary embodiment, a voltage properly controlled by a control circuit, which is not shown in the figure, based on an externally added image information is applied between the electrodes 15 and 17 from the voltage application part 21. The voltage applied herein is controlled imagewise with respect to each in-plane part on the display surface of the light modulation device. An image is written in the light modulation device 11 by the application of the controlled voltage.

The voltage applied herein is controlled to a voltage that exceeds the threshold value of the phase change of the cholesteric liquid crystal 12 or to a voltage that does not exceeds the threshold value, imagewise with respect to each in-plane part. The mode of the phase change may be freely selected depending on purposes.

Second Exemplary Embodiment

Figure 9:
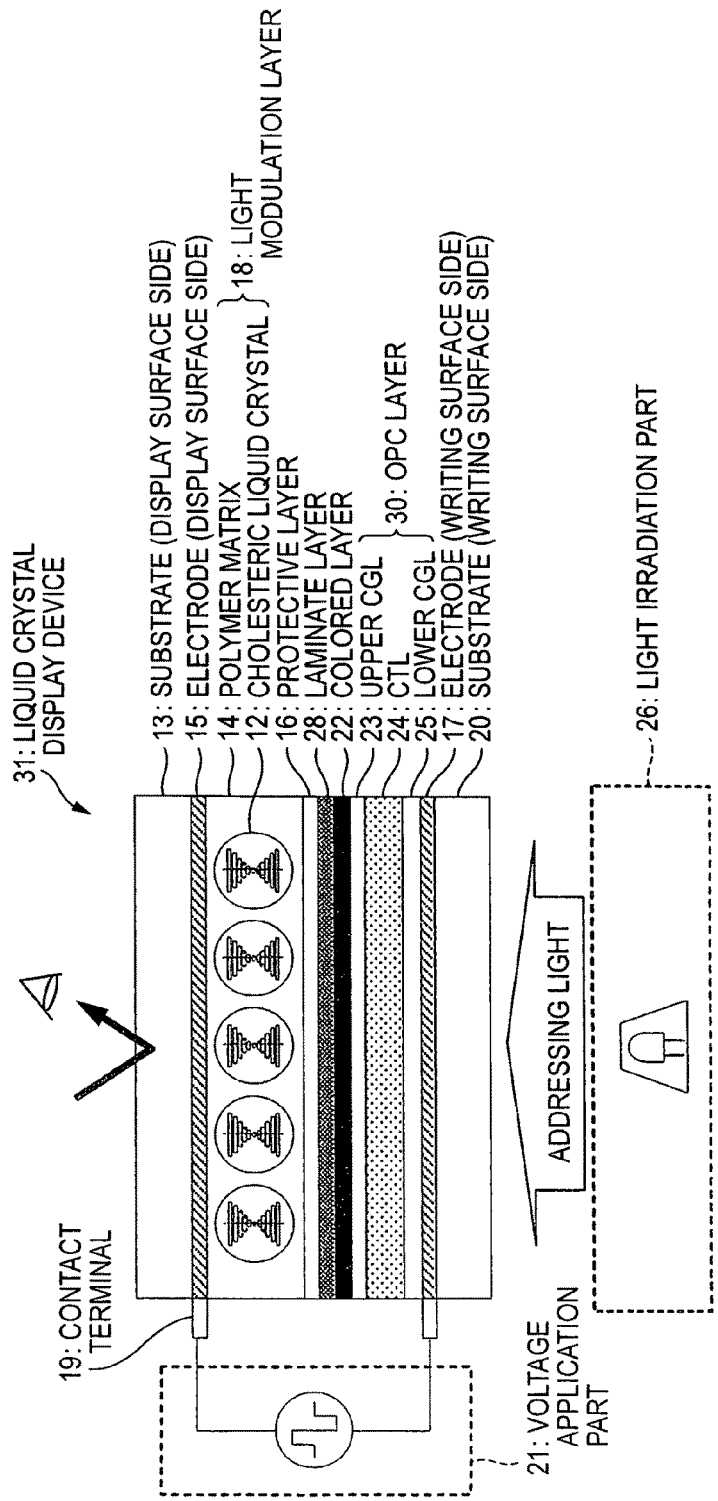
FIG. 9 is a schematic constitutional view showing a second exemplary embodiment as an example of the light modulation device of the invention.

FIG. 9 is a schematic constitutional view showing a second exemplary embodiment as an example of the light modulation device of the invention. The light modulation device of the exemplary embodiment can form a monochrome image through imagewise exposure under application of a voltage. The light modulation device of the exemplary embodiment has a similar structure as in the first exemplary embodiment, but is different in the point that an optically addressing liquid crystal device containing a photoconductor layer is constituted.

In the following description, the members having constitutions, functions and effects that are different from the first exemplary embodiment are mainly described, but the members having the same functions as in the first exemplary embodiment are attached with the same symbols as in the first exemplary embodiment to omit descriptions thereof.

The light modulation device of the exemplary embodiment has a constitution capable of effecting an optically addressing operation under irradiation of addressing light and application of a bias signal.

In the exemplary embodiment, the light modulation device 31 contains, laminated in this order from the side of the display surface, a substrate 13, an electrode 15, a light modulation layer 18, a protective layer 16, a laminate layer 28, a colored layer (light shielding layer) 22, an OPC layer (photoconductor layer) 30, an electrode 17 and a substrate 20. In other words, such a structure is provided that the laminate layer 28, the colored layer 22 and the OPC layer 30 are inserted between the protective layer 16 and the electrode 17 of the light modulation device 11 of the first exemplary embodiment. Only these layers characteristic in the exemplary embodiment will be described in more detail below.
(OPC. Layer)

The OPC layer (photoconductor layer) 30 has an internal photoelectric effect and is changed in impedance characteristics depending on the irradiation intensity of addressing light. The OPC layer 30 is preferably operated with an alternating current (AC) and preferably exhibits operation symmetrical with respect to the addressing light. In the exemplary embodiment, the OPC layer 30 has a three-layer structure containing an upper charge generating layer (upper CGL) 23, a charge transporting layer (CTL) 24 and a lower charge generating layer (lower CGL) 25, which are laminated in this order from the upper layer in FIG. 9.

The charge generating layers 23 and 25 have a function of generating photocarriers through absorption of addressing light. The charge generating layer 23 mainly controls the amount of photocarriers flowing from the electrode 15 on the side of the display surface to the electrode 17 on the side of the writing surface, and the charge generating layer 25 mainly controls the amount of photocarriers flowing from the electrode 17 on the side of the writing surface to the electrode 15 on the side of the display surface. The charge generating layers 23 and 25 can preferably generate excitons through absorption of addressing light and effectively separate them into free carriers inside the CGL or at the interface between CGL and CTL.

The charge generating layers 23 and 25 can be formed by a dry method, in which a charge generating material is directly formed into a film, or a wet applying method, in which a charge generating material is dispersed or dissolved in a suitable solvent along with a polymer binder to prepare an applying liquid, which is then coated and dried to form a film. Examples of the charge generating material include metallic or non-metallic phthalocyanine, a squalirium compound, an azulenium compound, a perylene pigment, an indigo pigment, a bis- or tris-azo pigment, a quinacridone pigment, a pyrrolopyrrole dye, a polycyclic quinone pigment, a condensed aromatic pigment, such as dibromoanthoanthrone, a cyanine dye, a xanthene pigment, a charge transfer complex of polyvinylcarbazole and nitrofluorene, and an eutectic complex containing a pyrylium salt dye and a polycarbonate resin. Examples of the polymer binder include a polyvinyl butyral resin, a polyarylate resin, a polyester resin, a phenol resin, a vinylcarbazole resin, a vinylformal resin, a partially modified vinylacetal resin, a carbonate resin, an acrylate resin, a vinyl chloride resin, a styrene resin, a vinyl acetate resin and a silicone resin.

The charge transporting layer 24 has a function of drifting the photocarriers, which have been generated in the charge generating layers 23 and 25 and injected into the charge transporting layer 24, in the direction of the electric field applied thereto.

The charge transporting layer 24 preferably undergoes injection of free carriers from the charge generating layers 23 and 25 with high efficiency (preferably has an ionization potential close to the charge generating layers 23 and 25), and preferably undergoes hopping migration of the injected free carriers as fast as possible. In order to increase the impedance in a dark condition, the dark current due to thermal carriers is preferably as low as possible.

The charge transporting layer 24 can be formed in such a manner that a low molecular weight hole transporting material or a low molecular weight electron transporting material is dispersed or dissolved in a suitable solvent along with a polymer binder to prepare an applying liquid, or a hole transporting material or an electron transporting material is polymerized and dispersed or dissolved in a suitable solvent to prepare an applying liquid, and the applying liquid is coated and dried. Examples of the low molecular weight hole transporting material include a trinitrofluorene compound, a polyvinylcarbazole compound, an oxadiazole compound, a hydrazone compound, such as a benzylamino hydrazone compound and a quinoline hydrazone compound, a stilbene compound, a triphenylamine compound, a triphenylmethane compound and a benzidine compound. Examples of the low molecular weight electron transporting compound include a quinone compound, a tetracyanoquinodimethane compound, a fluorenone compound, a xanthone compound and a benzophenone compound. Examples of the polymer binder include a polycarbonate resin, a polyarylate resin, a polyester resin, apolyimide resin, a polyamide resin, a polystyrene resin and a silicon-containing crosslinked resin.
(Colored Layer)

The colored layer (light shielding layer) 22 is provided for optically separating addressing light and incident light from each other upon writing to prevent false operation due to mutual interference from occurring, and for optically separating external light incident on the non-display side of the display device upon displaying and the displayed image from each other to prevent image quality from being deteriorated, and is not an essential element in the invention. However, the colored layer is preferably provided for improving the performance of the light modulation device 31. Taking the purpose of the colored layer 22 into consideration, the colored layer is demanded to have at least a function of absorbing light in an absorption wavelength range of the charge generating layer and light in a reflection wavelength range of the light modulation layer.

The colored layer 22 can be formed by a dry method, in which an inorganic pigment, an organic dye or organic pigment is directly coated on the surface of the OPC layer 30 on the side of the charge generating layer 23, or a wet applying method, in which these materials are dispersed or dissolved in a suitable solvent along with a polymer binder to prepare an applying liquid, which is then coated and dried to form a film. Examples of the inorganic pigment include a cadmium series, a chromium series, a cobalt series, a manganese series and a carbon series. Examples of the organic dye and the organic pigment include an azo series, an anthraquinone series, an indigo series, a triphenylmethane series, a nitro series, a phthalocyanine series, a perylene series, a pyrrolopyrrole series, a quinacridone series, a polycyclic quinone series, a squalirium series, an azulenium series, a cyanine series, a pyrylium series and an anthrone series. Examples of the polymer binder include a polyvinyl alcohol resin and a polyacrylate resin.

(Laminate Layer)

The laminate layer 28 is provided for undergoing absorption of unevenness and adhesion upon laminating the functional layers inside the upper and lower substrates 13 and 20, and is not an essential element in the invention. The laminate layer 28 is formed of a thermoplastic or thermosetting organic material or a mixed type organic material thereof, and such a material is selected therefor that can closely adhere the protective layer 16 on the surface of the light modulation layer 18 and the colored layer 22 under heat or pressure. The laminate layer 28 is necessarily transparent to the incident light.

Preferred examples of the material for the laminate layer 28 include a polymer material having tackiness and adhesiveness, such as a polyethylene series, a polypropylene series, a polyurethane series, an epoxy series, an acrylate series, a rubber series and a silicone series.

(Writing of Image)

In order to write an image in the light modulation device 31 of the exemplary embodiment, the light modulation device 31 is imagewise exposed with addressing light with the light irradiation part 26 while applying a voltage properly controlled by a control circuit, which is not shown in the figure, based on an externally added image information, between the electrodes 15 and 17 from the voltage application part 21. The addressing light is radiated imagewise with respect to each in-plane part on the writing surface of the light modulation device 31, at one time on the surface or by scanning on the surface. An image is written in the light modulation device 31 by the imagewise radiation of the addressing light.

The voltage applied herein is controlled to a voltage that does not exceed the threshold value of the phase change of the cholesteric liquid crystal 12 in a part not irradiated with addressing light, and to a voltage that exceeds the threshold value of the phase change only in a part irradiated with addressing light. The mode of the phase change may be freely selected depending on purposes.

Third Exemplary Embodiment

The third exemplary embodiment has the same layer constitution as in the light modulation device of the first exemplary embodiment, but is different from the first exemplary embodiment in such a point that before the temperature increasing step, the coated layer in a sol state is coated on the display layer in a sol state before cooling for changing to a gel state, and after the layers are gelled to provide the state before the temperature increasing step (5) shown in FIG. 6, the temperature increasing step is carried out. (Description of the layer constitution of the exemplary embodiment is omitted since it is the same as in the first exemplary embodiment, and the operations have been described with reference to FIG. 6.)

An applying liquid (particle dispersion liquid) in a transition state or a sol state containing the first material and the particles constituting the display layer (particle dispersion layer) heated to a temperature higher than $T_1$ (the maximum temperature where the first material maintains a gel state) is coated with a die coater (the applying step of a particle dispersion liquid (1)), and subsequently, an applying liquid (coated layer applying liquid) in a transition state or a sol state containing the second material constituting the protective layer (coated layer) heated to a temperature higher than $T_2$ (the maximum temperature where the second material maintains a gel state upon increase in temperature) is coated (the applying step of a coated layer applying liquid (3)).

At this time, the coated layer constituting the display layer (particle dispersion layer) is in a transition state or a sol state. Even though the coated layer applying liquid is laminated on the display layer (particle dispersion layer) in a sol state, which has not been cooled for gelation, the layers are not immediately mixed with each other, and accordingly, the layers are rapidly subjected to cold air blow for making the layers in a gel state. The layers are rapidly gelled to provide the state before the temperature increasing step (5) shown in FIG. 6.

The laminated body obtained is then subjected to the temperature increasing step and the drying step for hardening in the same manner as in the first exemplary embodiment, whereby a closely packed single layer film can be produced.

The light modulation device of the invention has been described with reference to preferred exemplary embodiments, but the invention is not limited to the exemplary embodiments. For example, while a light modulation device forming a monochrome image containing only one light modulation layer has been described in the exemplary embodiments, plural light modulation layers and other layers may be used depending on necessity to produce a light modulation device capable of forming a multi-color image, and light modulation layers displaying at least three primary colors, blue, green and red, may be used to produce a light modulation device capable of forming a full color image.

In any exemplary embodiment, the invention can be applied thereto as long as the light modulation device has a laminated body, in which the light modulation layer and the protective layer are laminated adjacent to each other. The light modulation device may contain only one pair of the light modulation layer and the protective layer defined in the invention, and may contain plural pairs thereof.

In the light modulation device of the invention, the protective layer may have other functions.

The laminated body, the method for producing the same, and the light modulation device according to the invention may be subjected modifications based on conventional knowledge by a skilled person in the art, which are encompassed in the scope of the invention as long as the constitutions of the laminated body, the method for producing the same, and the light modulation device according to the invention are satisfied.

EXAMPLE

The invention will be described in more detail below with reference to examples, but the invention is not construed as being limited to the examples.

Example 1

Preparation of Applying Liquid for Light Modulation Layer (Particle Dispersion Liquid)

77.5% by mass of a nematic liquid crystal (E7, a trade name, produced by Merck & Co., Inc.), 18.8% by mass of a chiral agent 1 (CB15, a trade name, produced by Merck & Co., Inc.) and 3.7% by mass of a chiral agent 2 (R1011, a trade name, produced by Merck & Co., Inc.) are mixed to prepare a cholesteric liquid crystal that selectively reflects green light.

2 g of the cholesteric liquid crystal is emulsified in 100 mL of a 0.25% by mass sodium dodecylbenzenesulfonate aqueous solution by using a membrane emulsifying equipment (Micro Kit, a trade name, produced by SPG Technology Co., Ltd.) set with a ceramic porous membrane having an average pore diameter of 4.2 μm under conditions of a nitrogen pressure of about 11.8 kPa (0.12 kgf/cm$^2$) to obtain an emulsion.

The resulting emulsion is arbitrarily sampled and imaged with a digital microscope (VHX-200, a trade name, produced by Keyence Corp.), and images of about 2,500 particles obtained are processed with a particle size measuring software (A-zou-kun, a trade name, produced by Asahi Kasei Engineering Corp.). The cholesteric liquid crystal droplets have a number average particle diameter of 14.9 μm with a standard deviation of the particle diameter of 1.32 μm, which shows a nearly monodisperse state.

The resulting emulsion is allowed to stand to precipitate the cholesteric liquid crystal droplets, and the supernatant is removed to obtain a concentrated emulsion. The volume ratio of the cholesteric liquid crystal droplets in the concentrated emulsion is measured with a densitometer (DMA35n, a trade name, produced by Nihon Siber Hegner Co., Ltd.), and thus the volume ratio is 0.535.

The ratio in coated area $A_L$ of the liquid crystal droplets to the coated area is set at 0.95, and the wet coated thickness is set at 90 μm. The volume ratio (Sr×Lr) of the cholesteric liquid crystal droplets in the applying liquid of the display layer is obtained by using the aforementioned expression (1) using the particle diameter of the cholesteric liquid crystal droplets (14.9 μm) and the wet applying thickness on the substrate (90 μm), and thus the volume ratio (Sr×Lr) is 0.10 (10% by volume).

Using the value as an index, 4 parts by mass of a 7.7% by mass aqueous solution of acid process bone gelatin (having a jelly strength of 314 g and a sol viscosity (60° C.) of 3.2 mPa·s, produced by Nippi, Inc.) is added to 1 part by mass of the concentrated emulsion to prepare an applying liquid for a light modulation layer having a volume ratio of non-volatile components in the applying liquid of about 0.15 and a volume ratio of the cholesteric liquid crystal in the non-volatile components of about 0.70.

Figure 10:
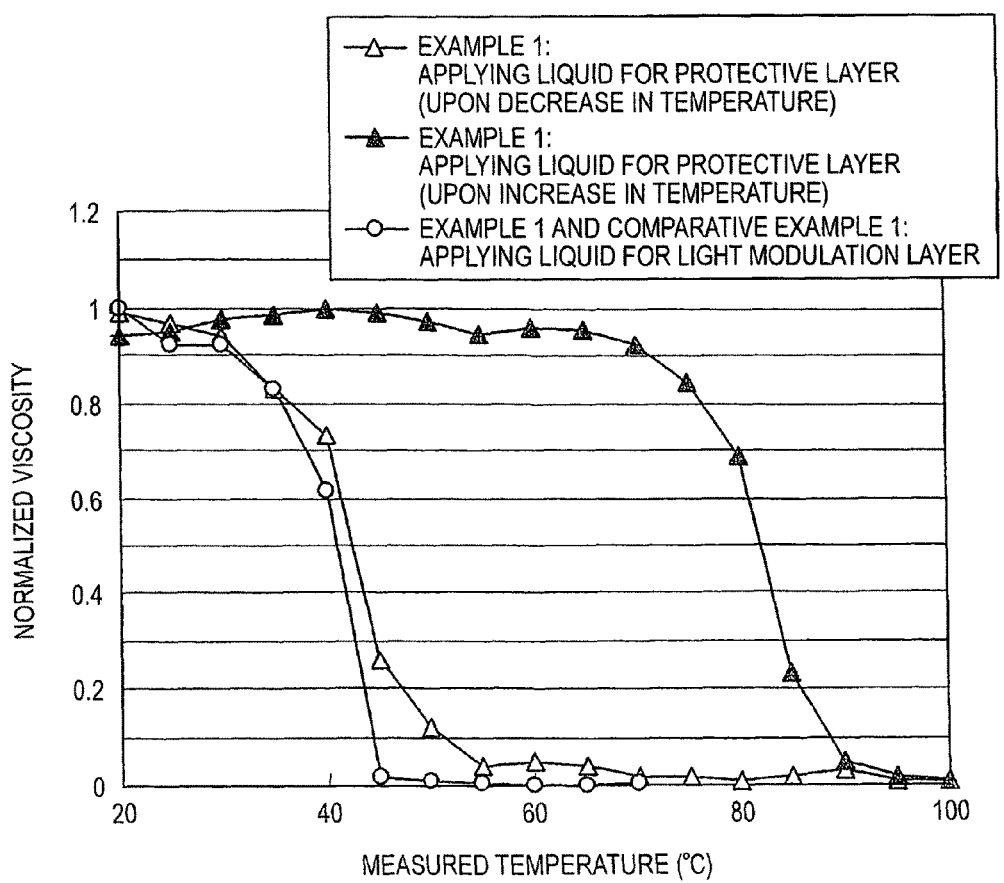
FIG. 10 is a graph showing the viscosity characteristics of the applying liquids in the example with respect to temperature.
Figure 11B:
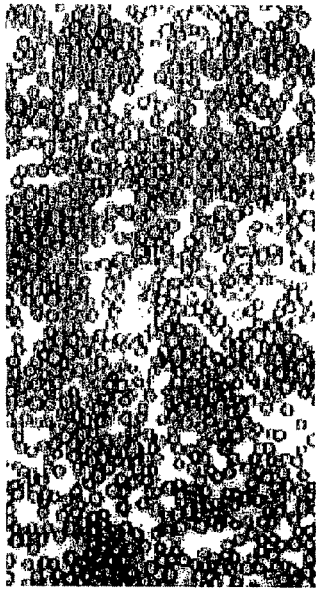
FIGS. 11A to 11D are drawings showing the results of imaging of the behavior of the applying liquid for a light modulation layer in the drying step for hardening with a digital microscope, in which the time advances from FIG. 11A to FIG. 11D.
Figure 11D:
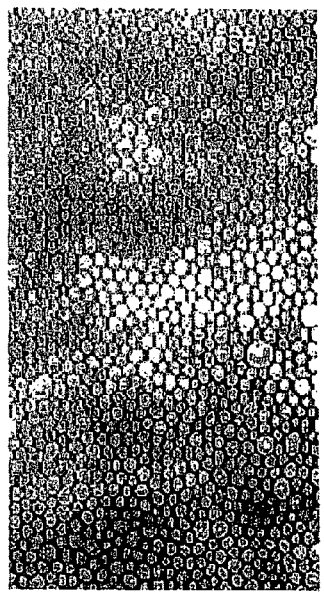
Figure 11A:
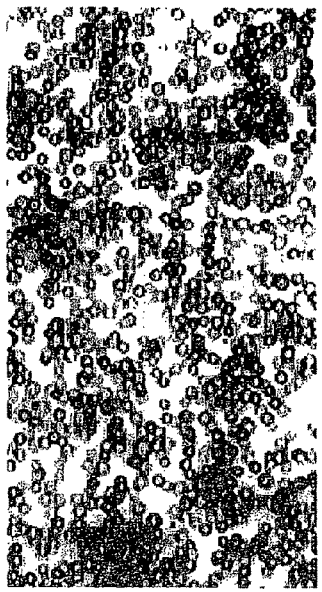
Figure 11C:
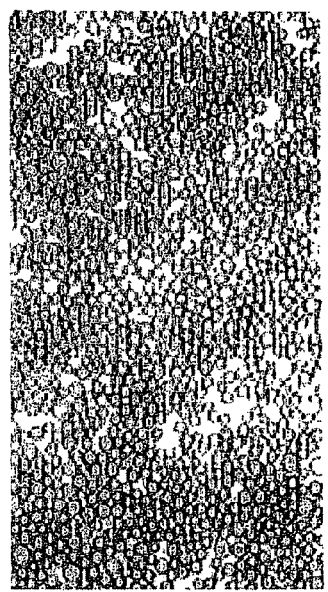

The resulting applying liquid for a light modulation layer is measured for change in viscosity with respect to temperature with a vibration viscosity meter (VM-10A-M, a trade name, produced by CBC Materials Co., Ltd.), and the result obtained is shown as the graph in FIG. 10. The applying liquid for a light modulation layer has a maximum temperature $T_1$ where the applying liquid maintains a gel state of about 38° C.
(Applying of Applying Liquid for Light Modulation Layer)

The applying liquid for a light modulation layer is heated to 50° C. to make gelatin contained therein in a sol state, and in this state, the applying liquid is coated on a polyethylene terephthalate (PET) substrate having a thickness of 125 μm and having an ITO transparent electrode (having a surface resistance of 300Ω per square) (Highbeam, a trade name, produced by Toray Industries, Inc.) on the surface having the ITO electrode with an applicator having a micrometer (K Paint Applicator, a trade name, produced by Matsuo Sangyo Co., Ltd.), which has a gap adjusted to provide a wet thickness after applying of 90 μm. (See the column of "During Applying Step of Particle Dispersion Liquid (1)" in FIG. 3.)

Subsequently, the substrate having been coated is allowed to stand at room temperature to cool gradually to 25° C., so as to gel gelatin contained in the applying liquid for a light modulation layer. (See the column of "After completing Cooling Step of Particle Dispersion Liquid (2)" in FIG. 3.)
(Preparation of Applying Liquid for Protective Layer (Coated Layer Applying Liquid))

As an applying liquid for a protective layer, a 1% by mass aqueous solution of agar (produced by Wako Pure Chemical Industries, Ltd.), to which 0.05% by mass of a surfactant (sodium dodecylbenzenesulfonate, produced by Kanto Chemical Co., Inc.) is added, is prepared (applying liquid for protective layer).

The resulting applying liquid for a protective layer is measured for change in viscosity with respect to temperature with a vibration viscosity meter (VM-10A-M, a trade name, produced by CBC Materials Co., Ltd.), and the result obtained is shown as the graph in FIG. 10. The applying liquid for a protective layer has a maximum temperature $T_2$ where the applying liquid maintains a gel state upon increase in temperature of about 80° C., and a maximum temperature $T_3$ where the applying liquid maintains a gel state upon decrease in temperature of about 45° C.
(Applying of Applying Liquid for Protective Layer)

On the applying liquid for a light modulation layer having been gelled, the applying liquid for a protective layer is coated at 60° C., at which agar contained in the applying liquid for a protective layer is in a sol state, with an applicator having a micrometer (K Paint Applicator, a trade name, produced by Matsuo Sangyo Co., Ltd.), which has a gap adjusted to provide a wet thickness after applying of 100 μm. (See the column of "During Applying Step of Coated Layer Applying Liquid (3)" in FIG. 3.) Subsequently, the substrate having been coated is allowed to stand at room temperature to cool gradually to 25° C., so as to gel agar contained in the applying liquid for a protective layer (the cooling step of a coated layer applying liquid (4) not shown in the figure).
(Drying for Hardening Coated Layers (Light Modulation Layer and Protective Layer))

The substrate having coated with the applying liquid for a light modulation layer and the applying liquid for a protective layer is placed on a hot plate at 55° C. and maintained for 10 minutes. It is considered from the results shown in the graph in FIG. 10 that in the initial stage of drying, gelatin in the applying liquid for a light modulation layer is changed from a gel state to a sol state, and agar in the applying liquid for a protective layer maintains a gel state owing to the hysteresis behavior thereof. (See the column of "After completing Temperature Increasing Step (5)" in FIG. 3.)

The behavior of the applying liquid for a light modulation layer in the drying step for hardening is imaged with a digital microscope (VHX-200, a trade name, produced by Keyence Corp.), and the results are shown in FIGS. 11A to 11D. In FIGS. 11A to 11D, the time advances in this order.

In the applying liquid for a light modulation layer, the positional relationship of the cholesteric liquid crystal droplets is gradually changed to a single layer state associated with advance of drying. (See FIGS. 11A to 11C.) Evaporation of the solvent advances to dry the coated film completely, whereby a laminated body A is obtained, which has the substrate having formed on the surface thereof a light modulation layer, in which the cholesteric liquid crystal droplets, which are deformed to a polyhedral column shape, are arranged to the form of a closely packed single layer, and a protective layer formed thereon as in FIG. 11D. (See the column of "After Completing Drying Step for Hardening (6) (finished)" in FIG. 3.

The thickness of the light modulation layer in the laminated body A measured with a laser 3D microscope (VK-8500, a trade name, produced by Keyence Corp.) is 12.6 µm, and the relationship between the average particle diameter D of the cholesteric liquid crystal droplets (14.9 µm) and the thickness t of the light modulation layer is D=1.18 t. The thickness of the protective layer is 1.2 µm, and the number average particle diameter of the cholesteric liquid crystal droplets in the light modulation layer is about 16.3 µm.

Figure 12:
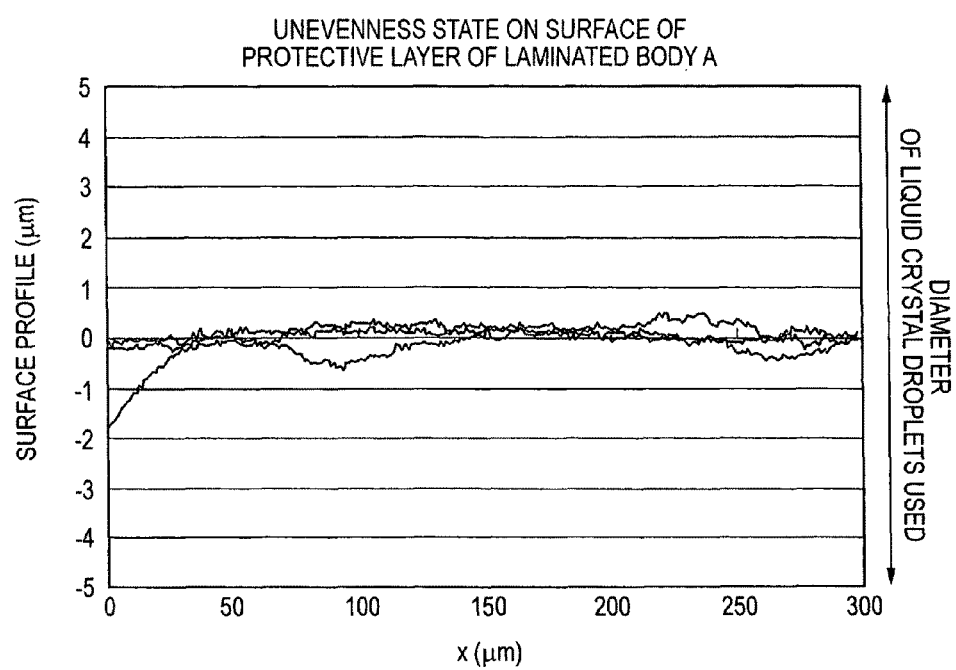
FIG. 12 is a graph showing the unevenness state on the surface of the protective layer of the laminated body obtained in Example 1, in which the abscissa indicates the position in the scanning direction on the surface of the protective layer, and the ordinate indicates the surface profile.

FIG. 12 is a graph showing the unevenness state on the surface of the protective layer of the laminated body A measured with a laser 3D microscope (VK-8500, a trade name, produced by Keyence Corp.), in which the abscissa indicates the position in the scanning direction on the surface of the protective layer (0 to 300 µm), and the ordinate indicates the surface profile. Three curves in the graph show measurement results in the three measurement locations on the surface of the protective layer of the laminated body A (n=3). For reference, a double-headed arrow corresponding to the diameter (average diameter) of the liquid crystal droplets used in the light modulation layer (particle dispersion layer) is shown on the right side of the graph (corresponding to the surface profile).

It is understood from the graph shown in FIG. 12 that the surface of the protective layer of the laminated body A has remarkably high smoothness. In particular, the high smoothness is conspicuous as compared to the diameter of the liquid crystal droplets used.

(Fabrication of Cell)

The same PET substrate as used as the substrate in the section of "Applying of Applying Liquid for Light Modulation Layer" is coated on the surface on the side of the ITO transparent electrode with a 9.0% by mass polyvinyl alcohol aqueous solution having a carbon black pigment dispersed to a ratio of 23 g/L to a thickness of 1.3 µm by spin applying to form a light shielding layer.

A urethane laminate agent (LX719/KY-90, produced by Dainippon Ink And Chemicals, Inc.) is coated on the light shielding layer by spin applying to a thickness of 1 µm to form an adhesion layer (laminate layer), whereby a laminated body B is obtained.

The laminated bodies A and B thus obtained are superimposed with the protective layer and the adhesion layer facing each other, and subjected to a laminator at 100° C. to adhere the laminated bodies, whereby a light modulation device of Example 1.

Comparative Example 1

A laminated body A' is obtained in the same manner as in Example 1 except that a 7% by mass aqueous solution of polyvinyl alcohol (Poval PVA210, a trade name, produced by Kuraray Co., Ltd.), to which 0.1% by mass of a surfactant (Dynol 604, a trade name, produced by Nisshin Chemical Industry Co., Ltd.) is added, is used as the applying liquid for a protective layer, which is coated to a wet thickness after applying of 30 µm. The applying liquid for a protective layer used in Comparative Example 1 is not gelled even though the temperature is changed.

Figure 13:
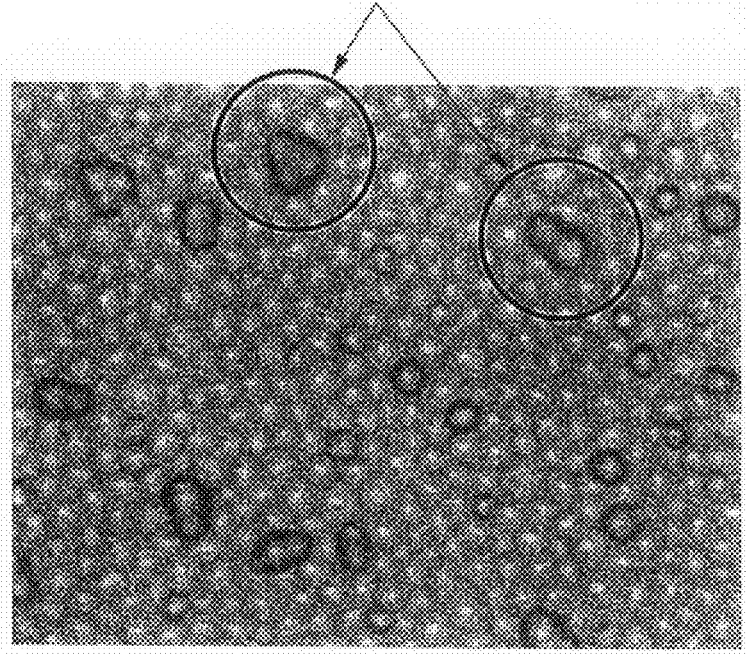
FIG. 13 is a drawing showing the result of imaging of the laminated body of Comparative Example 1 with a digital microscope.

A result of imaging of the laminated body A' obtained in Comparative Example 1 with a digital microscope (VHX-200, a trade name, produced by Keyence Corp.) is shown in FIG. 13. As understood from the image shown in FIG. 13, such a state is observed that the liquid crystal droplets in Comparative Example 1 have a shape close to sphere as compared to Example 1, and the light modulation layer and the protective layer are partially mixed with each other to leak the cholesteric liquid crystal droplets onto the protective layer.

A light modulation device of Comparative Example 1 is obtained by fabricating a cell using the laminated body B in the same manner as in Example 1 except that the laminated body A' is used.

(Measurement of Display Characteristics)

The light modulation devices obtained in Example 1 and Comparative Example 1 are measured for display characteristics in a planar state and a focal conic state with an integrating sphere type spectral color meter (Model CM2002, produced by Minolta Corp.). Specifically, the reflectivity in the state where regular reflection light is removed under diffused illumination (d8/SCE condition) is obtained with a reflectivity of a perfect diffusion plate being 100%. The results obtained are shown as a graph in FIG. 14.

Figure 14:
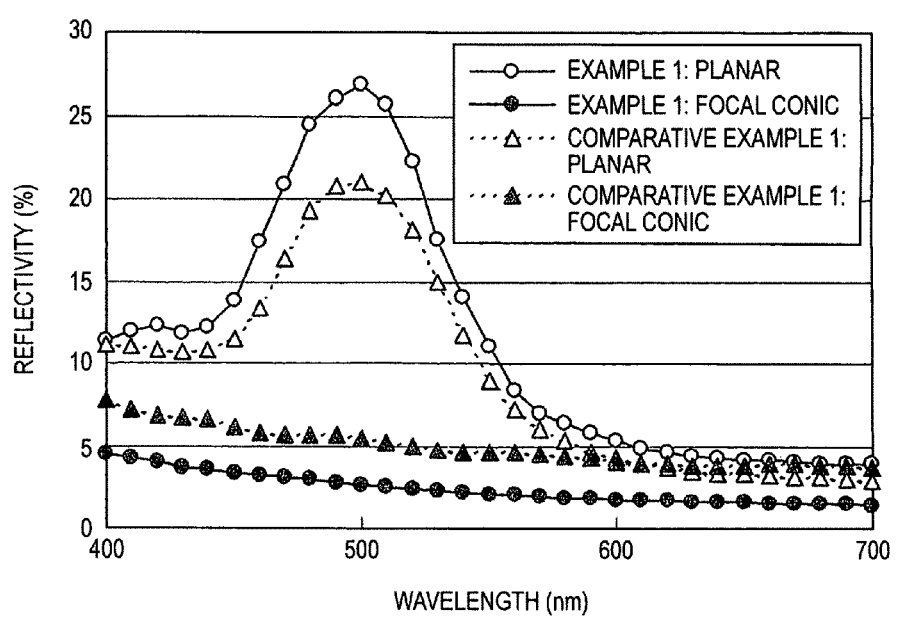
FIG. 14 is a graph showing the results of measurement in display characteristics of the light modulation devices of Example 1 and Comparative Example 1 in a planar state and a focal conic state.
Figure 15A:
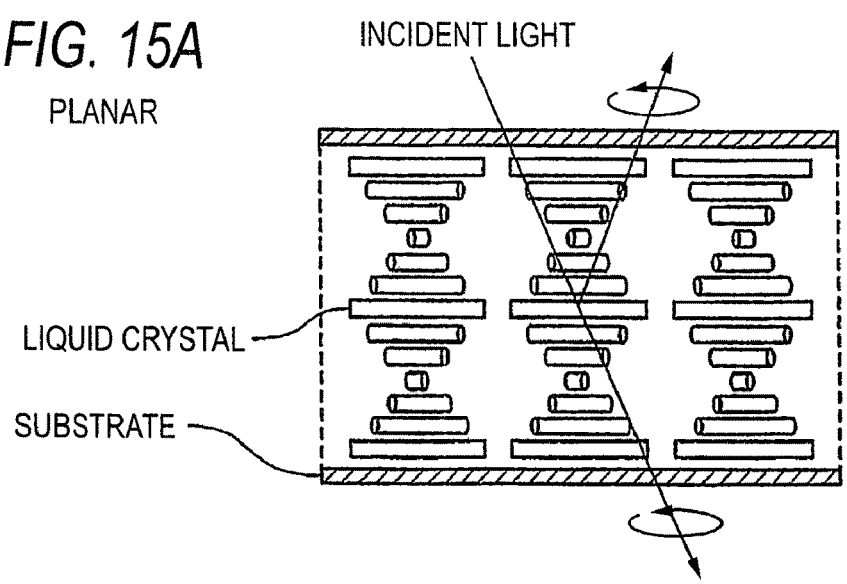
Figure 15B:
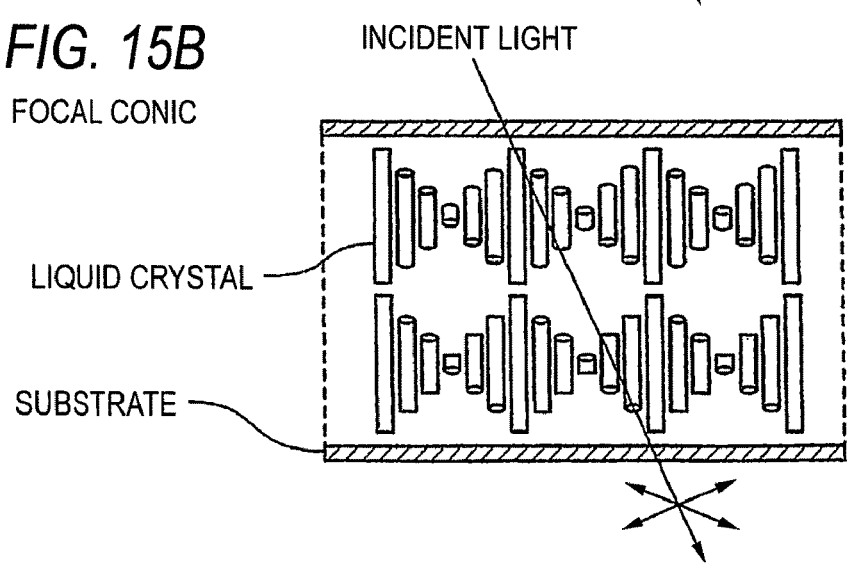
Figure 15C:
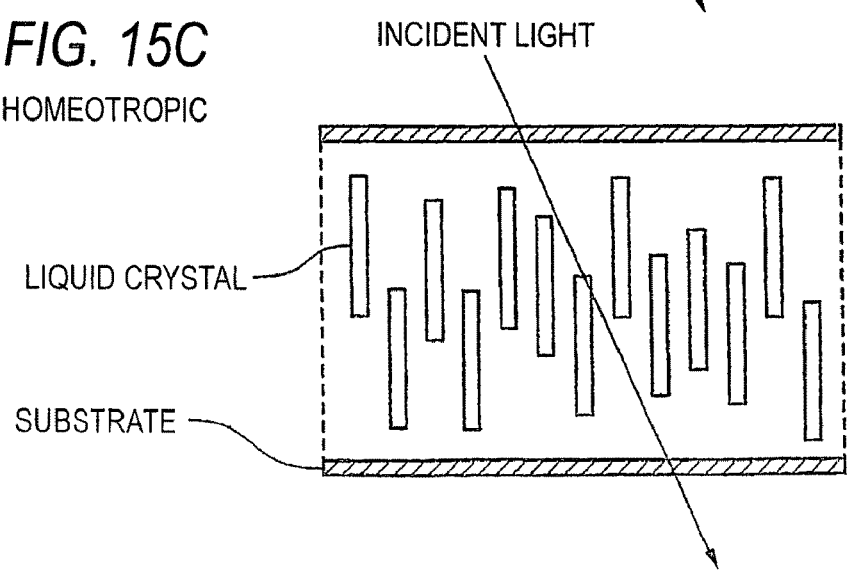
Figure 16:
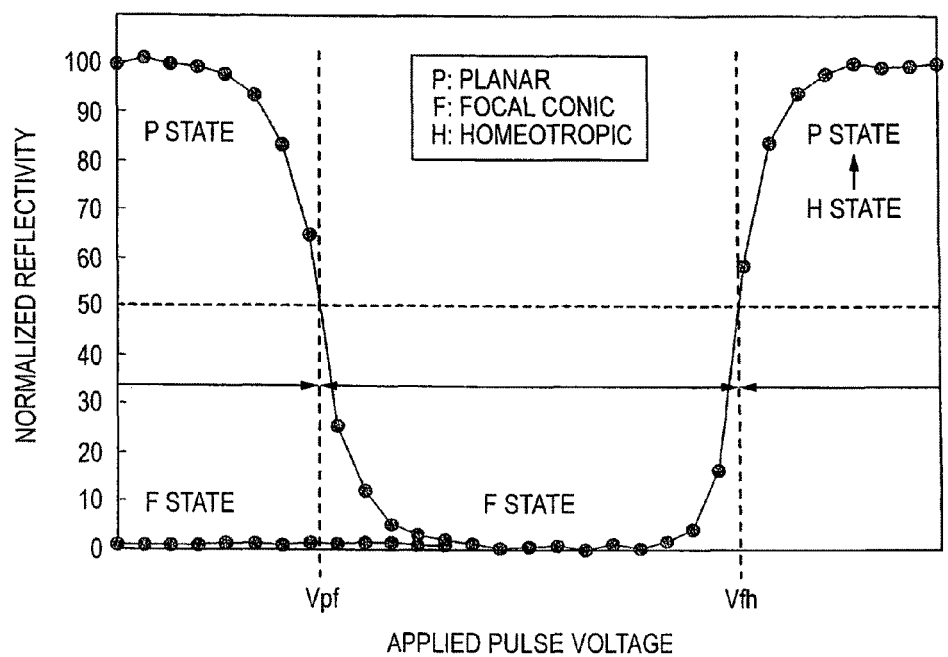
FIG. 16 is a graph for describing a switching behavior of a cholesteric liquid crystal

As shown in FIG. 14, Example 1 exhibits a higher reflectivity in the planar selective reflection state than Comparative Example 1 to show bright display. It is considered that the cholesteric liquid crystal is in the form of a polyhedral column in Example 1 to suppress disorder in orientation in the droplets, whereby a high reflection efficiency is provided.

Example 1 exhibits a lower reflectivity in the focal conic transmission state than Comparative Example 1 to show display with solid black color providing high contrast. It is considered that Example 1 has a distinct boundary between the light modulation layer and the protective layer to prevent the structure of the light modulation layer from being broken, but Comparative Example 1 has an unclear boundary between the light modulation layer and the protective layer to break the structure of the light modulation layer, and the cholesteric liquid crystal is leaked as display defects onto the protective layer to form unnecessary scattering source, which deteriorates the focal conic transmission state.

The laminated body and the method for producing the same according to the invention can be applied to a light modulation device and a method for producing the same as having been described, and also can be applied to various laminated bodies having a particle dispersion layer and methods for producing them, and therefore, the invention has considerable usefulness. Specifically, the invention can be applied, for example, to a colored sheet, a fluorescent sheet, a silver salt photographic film, an optical recording device, a magnetic recording device, a laser device, an artificial opal sheet, an interference reflection sheet, an antireflection sheet, a microlens array sheet, an adhesion sheet, a catalyst sheet, a sensor sheet, an electroconductive sheet, an electromagnetic shielding sheet, a filtering sheet and an adsorption sheet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A laminated body comprising:
   a particle dispersion layer comprising a first material and particles dispersed in the first material, the first material being changed from a gel state to a sol state upon increase in temperature; and
   a coated layer comprising a second material, the second material being changed from a gel state to a sol state upon increase in temperature, being changed from a sol state to a gel state upon decrease in temperature, and showing a hysteresis behavior in sol-gel change upon change in temperature,
   wherein the particle dispersion layer in a sol state and the coated layer in a gel state are laminated in contact with each other, and
   in a state where each of the particle dispersion layer and the coated layer contained a solvent, a maximum temperature $T_1$ where the first material maintains a gel state is less than a maximum temperature $T_2$ where the second material maintains a gel state upon increase in temperature ($T_1 < T_2$).

2. The laminated body as claimed in claim 1, which is obtained by drying the particle dispersion layer in a sol state and the coated layer in a gel state.

3. The laminated body as claimed in claim 1,
   wherein the particles are dispersed in the particle dispersion layer in a form of a single layer.

4. The laminated body as claimed in claim 3,
   wherein a particle diameter D of the particles and a thickness t of the particle dispersion layer satisfy the following expression (A):

$$0.5t \leq D \leq 2t \qquad (A).$$

5. The laminated body as claimed in claim 1,
   wherein the second material is a solution comprising: agar or a derivative thereof; and a solvent.

6. The laminated body as claimed in claim 1,
   wherein the first material is a solution comprising: gelatin or a derivative thereof; and
   a solvent.

7. A method for producing the laminated body of claim 1, the method comprising:
   increasing a first temperature of (i) the particle dispersion layer including a particle dispersion liquid having the first material and the particles dispersed in the first material and (ii) the coated layer including a coated layer applying liquid having the second material, to a second temperature,
   the first temperature being at which the coated layer applying liquid and the particle dispersion liquid are laminated to each other in a gel state, and the second temperature at which the coated layer applying liquid is in a gel state and the particle dispersion liquid is in a sol state; and
   drying the coated layer applying liquid and the particle dispersion liquid with the second temperature maintained.

8. The method for producing a laminated body as claimed in claim 7, further comprising:
   before increasing the first temperature of the particle dispersion layer and the coated layer applying liquid,
   applying the particle dispersion liquid on a surface of a substrate at a temperature at which the particle dispersion liquid is in a sol state, and
   applying the coated layer applying liquid on the particle dispersion liquid at a temperature at which the coated layer applying liquid is in a sol state, and
   wherein the method further comprises, between applying the particle dispersion liquid and applying the coated layer applying liquid, cooling the particle dispersion liquid to a temperature at which the particle dispersion liquid is in a gel state.

9. The method for producing a laminated body as claimed in claim 7, further comprising:
   before increasing the first temperature of the particle dispersion layer and the coated layer applying liquid,
   applying the particle dispersion liquid on a surface of a substrate at a temperature at which the particle dispersion liquid is in a sol state, and
   applying the coated layer applying liquid on the particle dispersion liquid at a temperature at which the coated layer applying liquid is in a sol state, and
   wherein the method further comprises, between applying the particle dispersion liquid and applying the coated layer applying liquid, preliminarily drying the particle dispersion liquid to a hardened state.

10. The method for producing a laminated body as claimed in claim 7, further comprising:
    before increasing the first temperature of the particle dispersion layer and the coated layer applying liquid,
    applying the particle dispersion liquid on a surface of a substrate at a temperature at which the particle dispersion liquid is in a sol state, and
    applying the coated layer applying liquid on the particle dispersion liquid at a temperature at which the coated layer applying liquid is in a sol state, and
    wherein the coated layer applying liquid is coated during applying the particle dispersion liquid.

11. The method for producing a laminated body as claimed in claim 7, further comprising:
    before increasing the first temperature of the particle dispersion layer and the coated layer applying liquid,
    applying the particle dispersion liquid on a surface of a substrate at a temperature at which the particle dispersion liquid is in a sol state, and
    applying the coated layer applying liquid on the particle dispersion liquid at a temperature at which the coated layer applying liquid is in a sol state, and
    wherein the method further comprises, between applying the coated layer applying liquid and increasing the first temperature of the particle dispersion layer and the coated layer applying liquid, cooling the coated layer applying liquid to a temperature at which the coated layer applying liquid is in a gel state.

12. The method for producing a laminated body as claimed in claim 7,
    wherein a maximum temperature $T_1$ where the first material maintains a gel state is less than a maximum temperature $T_2$ where the second material maintains a gel state upon increase in temperature ($T_1 < T_2$).

13. The method for producing a laminated body as claimed in claim 7,
    wherein the second material is a solution comprising: agar or a derivative thereof; and a solvent.

14. The method for producing a laminated body as claimed in claim 7, wherein the first material is a solution containing gelatin or a derivative thereof and a solvent.

15. The method for producing a laminated body as claimed in claim 7, further comprising before increasing the first temperature of the particle dispersion layer and the coated layer applying liquid, applying the particle dispersion liquid on a surface of a substrate at a temperature at which the particle dispersion liquid is in a sol state, and applying the coated layer applying liquid on the particle dispersion liquid at a temperature at which the coated layer applying liquid is in a sol state, wherein the particle dispersion liquid has a concentration of the particles that provides an amount of the particles dispersed in a form of a single layer in the particle dispersion layer of the laminated body produced.

16. A light modulation device comprising, between a pair of electrodes:

a light modulation layer comprising: a first material that is changed from a gel state to a sol state upon increase in temperature; and particles comprising a light modulation substance or a microencapsulated light modulation substance dispersed in the first material, and a protective layer comprising a second material that is changed from a gel state to a sol state upon increase in temperature, is changed from a sol state to a gel state upon decrease in temperature, and shows a hysteresis behavior in sol-gel change upon change in temperature, wherein the light modulation layer in a sol state and the protective layer in a gel state are laminated in contact with each other, and in a state where each of the light modulation layer and the protective layer contained a solvent, a maximum temperature $T_1$ where the first material maintains a gel state is less than a maximum temperature $T_2$ where the second material maintains a gel state upon increase in temperature ($T_1 < T_2$).

17. The light modulation device as claimed in claim 16, wherein the light modulation device is obtained by drying the light modulation layer in a sol state and the protective layer in a gel state.

18. The light modulation device as claimed in claim 16, wherein the light modulation substance is a cholesteric liquid crystal.

19. The light modulation device as claimed in claim 16, wherein the protective layer comprises agar or a derivative thereof.

20. The light modulation device as claimed in claim 16, wherein the light modulation layer comprises:

gelatin or a derivative thereof; and the particles dispersed in the gelatin or the derivative thereof.

21. The light modulation device as claimed in claim 16, wherein the particles have a polyhedral shape.

22. The light modulation device as claimed in claim 16, wherein the particles are dispersed in a form of a closely packed single layer in the light modulation layer.

23. The light modulation device as claimed in claim 22, wherein a particle diameter D of the particles and a thickness t of the light modulation layer satisfy the following expression (A):

$$0.5t \leq D \leq 2t \tag{A}$$

* * * * *